(12) United States Patent
Husted

(10) Patent No.: US 7,158,586 B2
(45) Date of Patent: Jan. 2, 2007

(54) SYSTEMS AND METHODS TO PROVIDE WIDEBAND MAGNITUDE AND PHASE IMBALANCE CALIBRATION AND COMPENSATION IN QUADRATURE RECEIVERS

(75) Inventor: Paul J. Husted, Palo Alto, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 847 days.

(21) Appl. No.: 10/139,138

(22) Filed: May 3, 2002

(65) Prior Publication Data

US 2003/0206603 A1    Nov. 6, 2003

(51) Int. Cl.
H04L 27/00    (2006.01)

(52) U.S. Cl. .................... 375/324; 375/344; 375/345; 455/309; 455/313

(58) Field of Classification Search ................. 375/219, 375/224, 225, 226, 227, 235, 316, 324, 329, 375/340, 344, 345; 455/309, 313
See application file for complete search history.

(56) References Cited

U.S. PATENT DOCUMENTS 5,705,949 A * 1/1998 Alelyunas et al. .......... 329/304
6,044,112 A   3/2000 Koslov ....................... 375/235
6,118,811 A   9/2000 Narumi ....................... 375/219
6,330,290 B1 * 12/2001 Glas ........................... 375/324
2002/0097812 A1 * 7/2002 Wiss ........................... 375/316

FOREIGN PATENT DOCUMENTS

WO    WO 01/91395    11/2001

* cited by examiner

Primary Examiner—Kevin Burd
Assistant Examiner—Freshteh N Aghdam
(74) Attorney, Agent, or Firm—Bever, Hoffman & Harms, LLP; Jeanette S. Harms

(57) ABSTRACT

Systems and methods for passively calibrating and correcting for I/Q mismatch in a quadrature receiver without the necessity of modifying the analog portion of the receiver by adding calibration signals or correction circuitry are presented. The passive I/Q mismatch calibration system proceeds using normally received incoming transmitted data signals to obtain statistical information on which to base I/Q mismatch compensation factors. The I/Q mismatch compensation factors can be used to adjust the magnitude and phase response in the time domain or the frequency domain, the analog or the digital portion of the receiver. Depending on the embodiment, the passive I/Q mismatch calibration system can calibrate frequency dependent gain or magnitude imbalance, frequency independent magnitude imbalance, frequency dependent phase imbalance, and frequency independent phase imbalance or combinations or these.

48 Claims, 9 Drawing Sheets

SYSTEMS AND METHODS TO PROVIDE WIDEBAND MAGNITUDE AND PHASE IMBALANCE CALIBRATION AND COMPENSATION IN QUADRATURE RECEIVERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to communication systems. More particularly, the invention is directed to receivers in communication systems. Even more particularly, the present invention is directed to in-phase/quadrature calibration systems for wireless and wireline communication system quadrature receivers.

BACKGROUND

The use of receivers in wireless systems such as radio and cellular communication systems is well-known in the art. FIG. 1 shows a typical quadrature receiver design 10. Receiver front-end processing 15 provides a signal such as an amplified intermediate frequency (IF) signal to mixers 20, 25. The front-end processing 15 can include, for example, an antenna that receives a radio frequency (RF) signal and provides the signal to an RF amplifier, which amplifies the RF signal. According to the example, the signal is then mixed in a mixer with a signal from a local oscillator to produce an IF signal that is amplified in an IF amplifier to produce the amplified IF signal. The IF signal is mixed with the quadrature outputs of a local oscillator 60 at mixers 20, 25 to generate respective in-phase (I) and quadrature (Q) signals. The I and Q signals are passed on their respective branches through, for example, low pass filters 30, 35 that eliminate the higher frequency components in the I and Q signals, and through one or more amplifiers 40, 45 to be digitized for further processing at respective analog-to-digital converters (ADCs) 50, 55. As is well known in the art, deviations from the ideal I and Q signals in the form of gain or magnitude and phase imbalances, i.e. differing gains for the I and Q signals as well as I and Q signals that are correlated due to the local oscillator 60 inputs at the mixers 20, 25 not being exactly 90 degrees out of phase, can cause degradations in the performance of the receiver.

Generally, prior attempts to calibrate and correct for magnitude and phase imbalances have involved analyzing dedicated transmitted calibration signals at the receiver to produce correction factors to be applied to received signals carrying data of interest, either at the analog side or the digital side. A representative example of the literature is R. A. Green, in "An Optimized Multi-tone Calibration Signal for Quadrature Receiver Communication Systems," 10$^{th}$ IEEE Workshop on Statistical Signal and Array Processing, pp. 664–667, Pocono Manor, Pa., August 2000, which develops an optimized multi-tone calibration signal to which linear regression techniques are applied to generate correction factors to update adaptive filters that are intended to compensate for gain and phase imbalances. Special circuitry typically needs to be used to produce, analyze, and correct for the results of analysis on such calibration signals. A further drawback is that the quadrature receiver typically cannot continue to actively receive normal transmitted data while the calibration is occurring.

It would be desirable to provide I/Q calibration at a quadrature receiver that does not require that a separate calibration signal be transmitted to the receiver and that does not necessarily involve additional analog componentry prior to the ADCs.

SUMMARY

The presently preferred exemplary embodiments described herein according to aspects of the present invention implement passive I/Q imbalance or mismatch calibration and techniques in order to, for example, prevent and limit quadrature receiver performance degradation due to magnitude and phase mismatch between in-phase and quadrature channels of the quadrature receiver.

More particularly, systems and methods for passively calibrating and correcting for I/Q mismatch in a quadrature receiver without the necessity of modifying the analog portion of the receiver by adding calibration signals or correction circuitry are present according to aspects of the present invention. According to an example, the passive I/Q mismatch calibration system proceeds using normally received incoming transmitted data signals to obtain statistical information on which to base I/Q mismatch compensation factors. The I/Q mismatch compensation factors can be used to adjust the magnitude and phase response in the time domain or the frequency domain, the analog or the digital portion of the receiver. Depending on the embodiment, the passive I/Q mismatch calibration system can calibrate frequency dependent gain or magnitude imbalance, frequency independent magnitude imbalance, frequency dependent phase imbalance, and frequency independent phase imbalance or combinations or these. The calibration may occur for a set number of samples followed by, or accompanied by, compensation based on the analysis. In other embodiments, an iterative approach using, for example, least mean square techniques may be used on an ongoing basis to provide adaptive compensation for I/Q mismatch.

A first exemplary method of calibrating and compensating for magnitude and phase imbalances in a quadrature receiver is presented according to one aspect of the present invention. According to the method, first correction factors are generated from in-phase and quadrature digital signals. The signals are derived from a received signal. The received signal is other than a signal received solely for the purposes of calibration. One or more of frequency independent magnitude imbalance and frequency independent phase imbalance are compensated for using at least some of the first correction factors.

A second exemplary method of calibrating and compensating for magnitude and phase imbalances in a quadrature receiver is presented according to another aspect of the present invention. According to the method, first correction factors are generated from in-phase and quadrature digital signals. The signals are derived from a received signal. The received signal is other than a signal received solely for the purposes of calibration. One or more of frequency dependent magnitude imbalance and frequency dependent phase imbalance are compensated for using at least some of the first correction factors.

A third exemplary method of calibrating and compensating for magnitude and phase imbalances in a quadrature receiver is presented according to a further aspect of the present invention. According to the method, first and second correction factors are generated from in-phase and quadrature digital signals, The signals are derived from a received signal. The received signal is other than a signal received solely for the purposes of calibration. The first correction factors are generated following an initial calibration period during which the in-phase and quadrature digital signals are configured to have approximately equal phase. One or more of frequency independent magnitude imbalance, frequency independent phase imbalance, frequency dependent magnitude imbalance, and frequency dependent phase imbalance are compensated for using the first and second correction factors.

An exemplary method of calibrating magnitude and phase imbalances in a quadrature receiver is presented according to a further aspect of the present invention. According to the method, statistical calibration of in-phase and quadrature digital signals is performed over the full frequency range of the signals and at one or more separate frequencies of interest at which the in-phase and quadrature digital signals are composed. The signals are derived from a received signal. The received signal is other than a signal received solely for the purposes of calibration. Phase and magnitude imbalance correction factors are generated based on the statistical calibration.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF PRESENTLY PREFERRED EXEMPLARY EMBODIMENTS

The present invention will now be described in detail with reference to accompanying drawings, which are provided as illustrative examples of preferred embodiments of the present invention.

The presently preferred exemplary embodiments described herein according to aspects of the present invention implement passive I/Q imbalance or mismatch calibration and techniques in order to, for example, prevent and limit quadrature receiver performance degradation due to magnitude and phase mismatch between in-phase and quadrature channels of the quadrature receiver. In the following description, for purposes of explanation, numerous specific details are set forth in order to provide a thorough understanding of the present invention. It will be evident, however, to one skilled in the art that the present invention may be practiced in a variety of communications systems and radio frequency circuits, especially an orthogonal frequency division multiplexing circuit, without these specific details. In other instances, well-known operations, steps, functions, and elements are not shown in order to avoid obscuring the invention.

Parts of the description will be presented using terminology, notation, and techniques commonly employed by those skilled in the art to convey the substance of their work to others skilled in the art, such as orthogonal frequency division multiplexing (OFDM), fast Fourier transform (FFT), finite impulse response (FIR) filter, vector and scalar operations, real and imaginary (complex), magnitude and phase (exponential) notation, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment," and the like, does not necessarily refer to the same embodiment, although it may.

Figure 1:
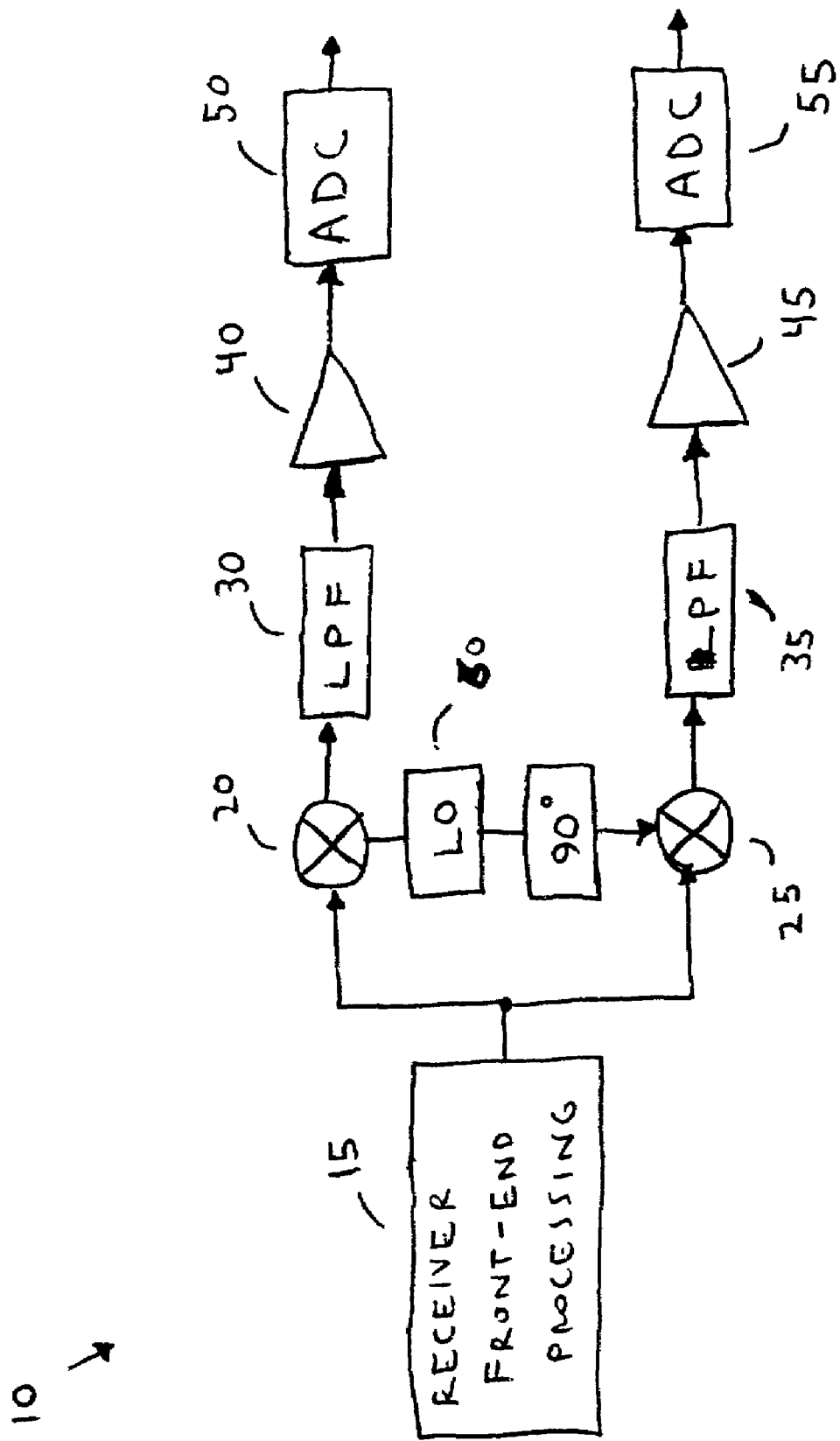
FIG. 1 is a block diagram illustrating an exemplary quadrature receiver according to the prior art.
Figure 2:
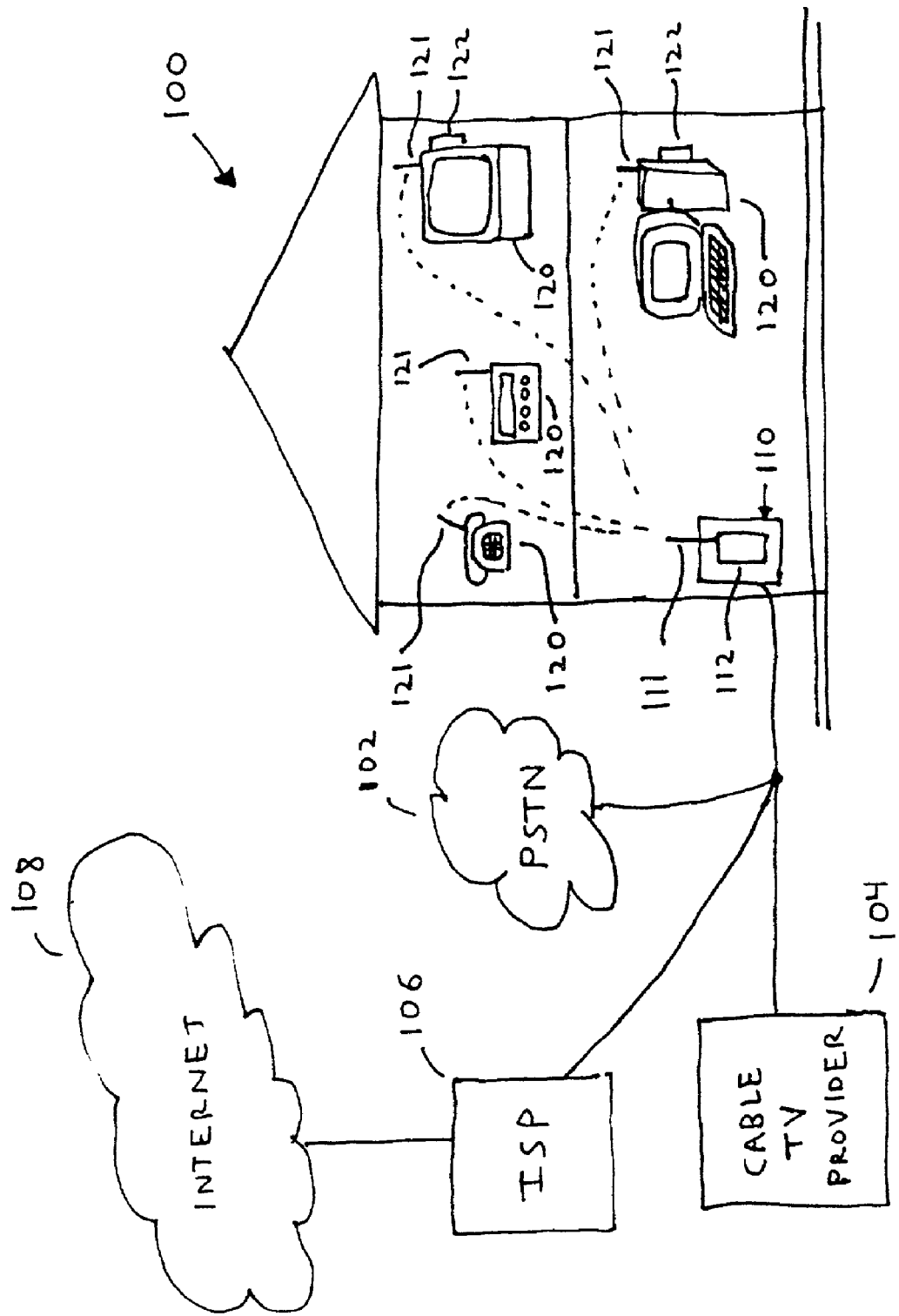
FIG. 2 illustrates a communication system according to one embodiment of the present invention.

FIG. 2 illustrates a communication system according to one embodiment of the present invention. System 100 includes a gateway 110 in a home environment which is connected via a cable (or multiple cables) to the public switched telephone network (PSTN) 102, a cable television provider system 104, an Internet service provider (ISP) 106 that provides access to the Internet 108, or some other system. Although a home environment is illustrated, the system 100 may be used in any suitable environment, such as an office environment. Gateway 110 includes a transceiver 112 and antenna 111. Corresponding customer premise equipment (CPE) 120 such as appliances 120 includes respective transceivers 122 and antennas 121. The CPE 120 could be, for example, a television 120, a computer 120, a telephone 120, or some other appliance 120. The transceiver 112 provides the transceiver(s) 122 with a wireless connection to the systems 102, 104, 106 that are connected to the gateway 110. According to one embodiment, the transceivers 112, 122 communicate in accordance with the IEEE 802.11a standard. Consequently, each of the transceivers 112, 122 includes a receiver and a transmitter that communicate information formatted according to the IEEE 802.11a standard. In other embodiments, as indicated below, the transceivers 112, 122 may have design features that deviate from the IEEE 802.11a standard. For example, the present invention can be practiced in a system that has a packet structure that is different from the IEEE 802.11a standard; e.g., a different number of symbols having a known amplitude and phase, different organization and number of guard intervals, data symbols, long symbols. Furthermore, the present invention can be practiced with sampling rates specified by the standard or other rates, and a different number of carriers, among other differences. Most generally, the present invention is practiced on a quadrature communication receiver. An OFDM compatible quadrature receiver represents an exemplary system within which the present invention can be practiced.

Figure 3:
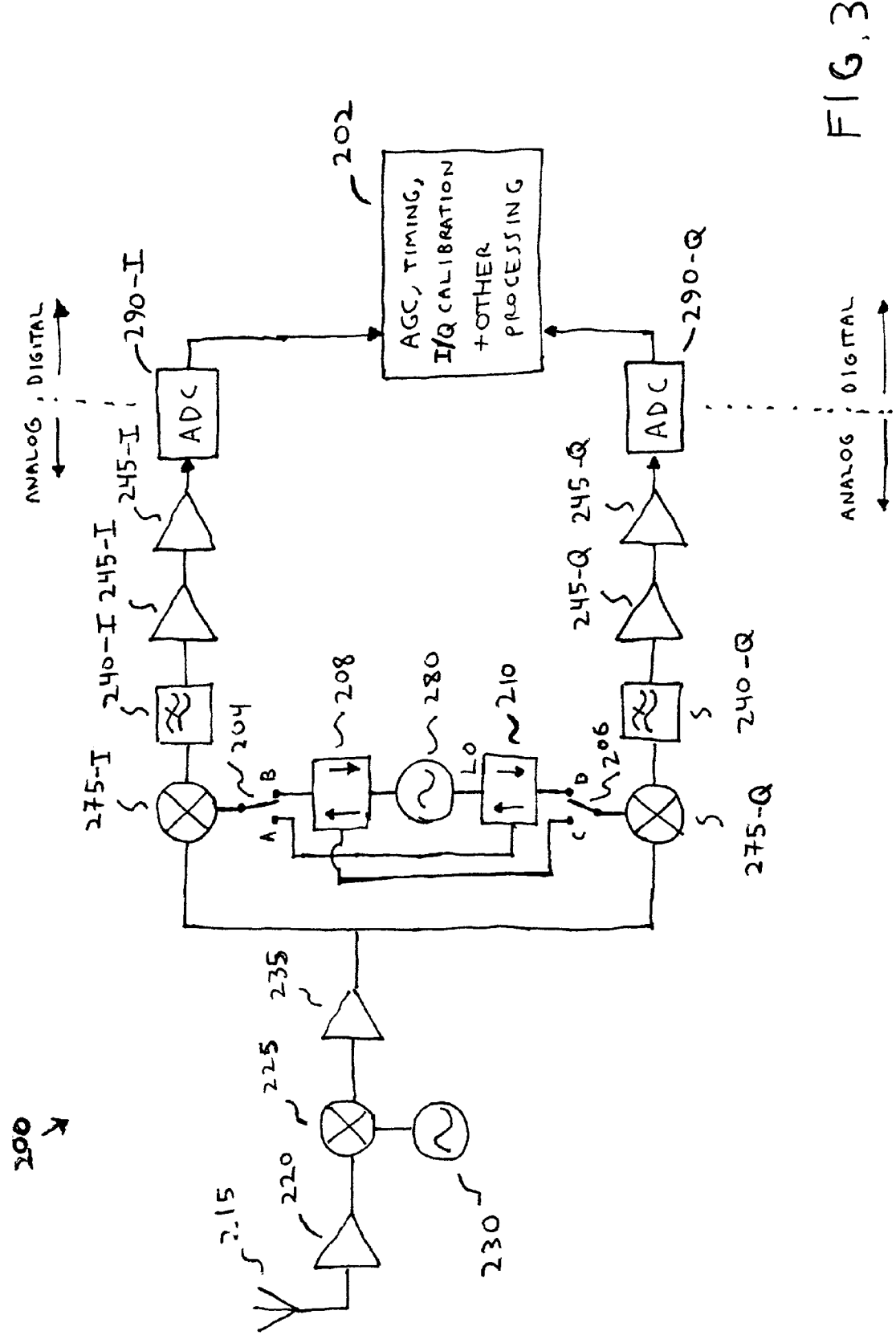
FIG. 3 is a block diagram illustrating an exemplary quadrature receiver according to an aspect of the present invention that includes an exemplary I/Q imbalance calibration block.

FIG. 3 is a block diagram illustrating an exemplary quadrature receiver 200 according to an aspect of the present invention. The receiver 200 includes a exemplary processing block 202 that includes passive I/Q imbalance calibration functionality. A wideband antenna 215 receives a radio frequency (RF) signal and provides the RF signal to an RF amplifier 220, and a particular channel or signal within the band is preferably selected by varying the local oscillators 230 and 280. In this embodiment, the RF signal preferably conforms to the IEEE 802.11a standard, has a frequency in the 5 GHz band, and is quadrature modulated to carry 6 to 54 Mbps. In this embodiment, the signal can carry up to 54 Mbits of data and lies within one of twelve 20 MHz wide slots, eight within a 5.15–5.35 GHz band and four within a 5.75–5.85 GHz band. The signal in this embodiment is a coded orthogonal frequency division multiplexed (OFDM) signal using 52 subcarriers spaced 312.5 kHz apart. It is understood, however, that while the following detailed description of the present invention is made in the context of an IEEE 802.11a system, that the inventions described herein have application to many different types of communication systems, and are not limited to systems operating within the IEEE 802.11a standard. For example, as described hereinafter the present invention is described as operating upon the short and long training symbols, the signal symbols, and the data symbols in an IEEE 802.11a system, but it is noted that the teachings related thereto can be generalized to any training, data, or other sequence made up of one or more sinusoids. Most generally, the teachings can be generalized to any waveform in a quadrature receiver that operates in any communications system, wireless or wireline.

The amplified RF signal is mixed with a signal from a local RF oscillator 230 supplied to an RF mixer 225 to generate an intermediate frequency (IF) signal that is fed to an IF amplifier 235. Preferably, the sum of the frequencies of the local RF oscillator 230 and local IF oscillator 280 are in the range 5.15–5.35 and 5.75–5.85 GHz, with the ratio of the RF oscillator 230 frequency to the IF oscillator 280 frequency being 4:1. In the embodiment, the local oscillators 230 and 280 are preferably in a floating IF arrangement in which they both are variable, rather than a fixed IF arrangement where, e.g., only the RF local oscillator 230 is variable.

The amplified IF signals are supplied to an in-phase mixer 275-I and a quadrature mixer 275-Q, respectively. In this embodiment, the in-phase mixer 275-I is switchably connected at a switch 204 to either a first phase shifter 208 or a second phase shifter 210 at respective contact points B and A. Similarly, the quadrature mixer 275-Q is switchably connected at a switch 206 to either the second phase shifter 210 or the first phase shifter 208 at respective contact points D and C. The local IF oscillator 280 is phase shifted by 45° in the first phase shifter 208 and is phase shifted by −45° in the second phase shifter 210. During normal operation, the in-phase mixer 275-I is connected at point B to the first phase shifter 208 and the quadrature mixer 275-Q is connected at point D to the second phase shifter 210. In this way, in-phase (I) and quadrature (Q) components of the received RF signal are obtained at the outputs of the in-phase mixer 275-I and the quadrature mixer 175-Q, i.e., the I and Q components are ideally 90° out of phase with one another. The local IF oscillator 280 is illustrated as connected in this switched 204, 206 arrangement because during some portions of passive I/Q calibration according to various preferred embodiments the I and Q components are purposely driven by the local IF oscillator signal at the same phase shifter, i.e. either phase shifter 208 or phase shifter 210. For example, during this calibration stage, the in-phase mixer 275-I may be connected at point B to the first phase shifter 208 while the quadrature mixer 275-Q is connected at point C to the same phase shifter 208, so that the mixers 275-I, 275-Q receive the local IF oscillator signal shifted by the same amount so that the "I" and "Q" components during this stage are ideally in phase with one another. It should be understood that this switched local IF oscillator 280 arrangement is described in high level detail so as not to obscure the invention, and the implementation of such a switched design, or its equivalents, using analog circuitry will be readily apparent to those skilled in the art.

As an alternative example, in embodiments in which a switched local IF oscillator is not required for passive I/Q calibration, one of the in-phase mixer 275-I and the quadrature mixer 275-Q is directly driven by the local IF oscillator 280, and the other of the in-phase mixer 275-I and the quadrature mixer 275-Q is driven by the local IF oscillator signal after the signal is phase-shifted by 90° in an appropriately configured phase shifter (not shown). In this way, I and Q components of the received RF signal are also obtained at the outputs of the in-phase mixer 275-1 and quadrature mixer 275-Q, respectively.

Regardless of the local IF oscillator 280 arrangement in use, the mixed IF signals pass through low-pass filters 240-I, 240-Q to select the desired channel and remove spectrally distant components not of interest, and are amplified by two series of baseband amplifiers 245-I, 245-Q. Though two baseband amplifiers are shown in each branch, a different number of amplifiers may of course be used. Almost any desired baseband gain step arrangement may be developed using baseband amplifiers having appropriately selected programmable gains in a particular order.

Preferably, the low-pass filters 240-I, 240-Q are fourth-order Butterworth filters having a 3 dB corner at 11 MHz. Moving from the analog to digital domain, the baseband amplifier outputs are fed to analog to digital converters (ADCs) 290-I, 290-Q, which digitize the I and Q component signals, preferably with a frequency of 80 MHz, to a resolution of nine bits, and an input dynamic range of −500 mV to 500 mV.

Preferably, the ADCs 290-I, 290-Q are pipeline ADCs; however, the invention is not so limited. For example, sigma-delta or other converters may be used in their place.

An analog channel filter and/or anti-aliasing filter may advantageously be placed before the ADCs 290-I, 290-Q. In the preferred embodiment, the combination of the analog filters performs adjacent blocker rejection of 12 dB and alternate blocker rejection of 45 dB. With a worst case of an adjacent blocker 16 dB larger and an alternate blocker 32 dB larger, a received blocker at the A/D converter input can be 4 dB higher than the in-band signal. As is known in the art, an adjacent blocker is an interference signal adjacent to or overlapping the frequency band of interest, while an alternate blocker is an interference signal farther away from the frequency band of interest.

The digitized I/Q component signals are provided to an automatic gain control (AGC), timing, I/Q calibration and other processing unit 202 whose operation with respect to the present invention will be described in greater detail below, with particular regard to the I/Q calibration functionality. Although not of particular concern here, gain control signals based on the sampled I and Q component signals are generated by the AGC portion of unit 202 and are preferably provided to the amplifiers 220, 235, 245-I, 245-Q of FIG. 3 for gain adjustment and compensation.

The AGC, timing, I/Q calibration and other processing unit 202 performs various functions to manage the amplifier gains and symbol timing. In one exemplary implementation, each OFDM packet includes ten short symbols, two long symbols, a signal portion, and a data portion, made up of symbols. According to the exemplary implementation, the AGC within an AGC and timing unit 295 (shown in, for example, FIG. 4) finds the packet and examines the first six short symbols within each packet, sizes the gains appropriately at the ADCs 290-I, 290-Q, and starts the timing circuitry 295. According to the exemplary implementation and assuming that an FFT is used, the timing circuitry 295 examines the last four short symbols and the two long symbols within each packet and finds the symbol boundary to establish a window for the FFT, and finds the frequency offset, performing self-correlation of the packet. The timing circuitry 295 also measures the DC offset and estimates the frequency domain channel after the FFT. An exemplary AGC implementation is discussed in more detail in U.S. application Ser. No. 09/849,595, filed on May 4, 2001, and entitled "Self-Correlation Detection in Automatic Gain Calibration."

The passive IQ Calibration of a packet as performed by the unit 202 and according to aspects of the present invention is preferably performed during not only a training portion of the packet, but also during a data portion of the packet, for a given number of symbols, or packets, or FFT calculations, etc.

As is well known in the art, deviations from ideal I and Q signals in the form of gain or magnitude and phase imbalances, i.e. differing gains for the I and Q signals and I and Q signals that are not exactly 90 degrees out of phase, can cause degradations in the performance of a quadrature receiver. Phase and magnitude IQ mismatches generally have components that vary across frequency and components that are independent of frequency. These different types of mismatch arising at the analog portion of the receiver and seen at the digital portion of the receiver, i.e. at the digitized I/Q component signals, can be described with reference to FIG. 3. Frequency independent phase mismatch (FIPM) is a phase imbalance between the I and Q signals that is constant across frequency. FIPM is due to the signals from the LO 280 arriving at the mixers 275-I, 275-Q not being 90 degrees out of phase with one another, since any deviation from 90 degrees between the signals at the mixers 275-I, 275-Q causes an equal phase mismatch across all baseband frequencies. Frequency dependent phase mismatch (FDPM) is a phase imbalance between the I and Q signals that varies across frequency. FDPM has a linear component and a nonlinear component. The linear component of FDPM arises from a time delay experienced in the I or the Q signal path between the mixers 275-I, 275-Q and the ADCs 290-I, 290-Q that translates into a linear phase mismatch across frequency. The nonlinear portion of FDPM is due to differences between the low pass filters (LPFs) 240-I, 240-Q, e.g. the filters typically exhibit slightly different frequency responses, especially nearer to the corner frequency. As is well known in the art, for off-chip filters, this difference in response typically arises from component tolerances, while for on-chip filters this is a device matching issue. Frequency independent magnitude mismatch (FIMM) is a gain or magnitude imbalance between the I and Q signals that is constant across frequency. FIMM is caused by variance in the net gains between the I and Q signal paths, occurring, for example, at one or more of the baseband (BB) amplifiers 245-I, 245-Q and possibly the mixers 275-I, 275-Q as well. Frequency dependent magnitude mismatch (FDMM) is a gain or magnitude imbalance between the I and Q signals that varies across frequency. Like FDPM, FDMM arises from the LPFs 240-I, 240-Q exhibiting different responses, i.e. responses having differing cutoff frequencies.

Depending on the nature of the mismatch, i.e. phase or magnitude, frequency dependent or frequency independent, different calibration and correction techniques can be used according to aspects of the present invention. Several exemplary embodiments of the I/Q calibration unit 202 and sub-processing elements thereof are illustrated in FIGS. 4–9.

The passive I/Q calibration according to aspects of the present invention preferably uses a statistical approach in which a certain number of symbols and a certain number of packets including the symbols, i.e. a set number of samples of the I/Q digitized signals, are analyzed. Compensation for the FIPM, FDPM, FIMM, and FDMM, or combinations thereof, is then performed based on the results of the analysis. Of course, in other embodiments, an iterative approach using, for example, least mean square techniques may be used on an ongoing basis to provide adaptive compensation for I/Q mismatch. That is, ongoing and adaptive calibration and compensation techniques can also be used advantageously in accordance with the present invention.

Figure 4:
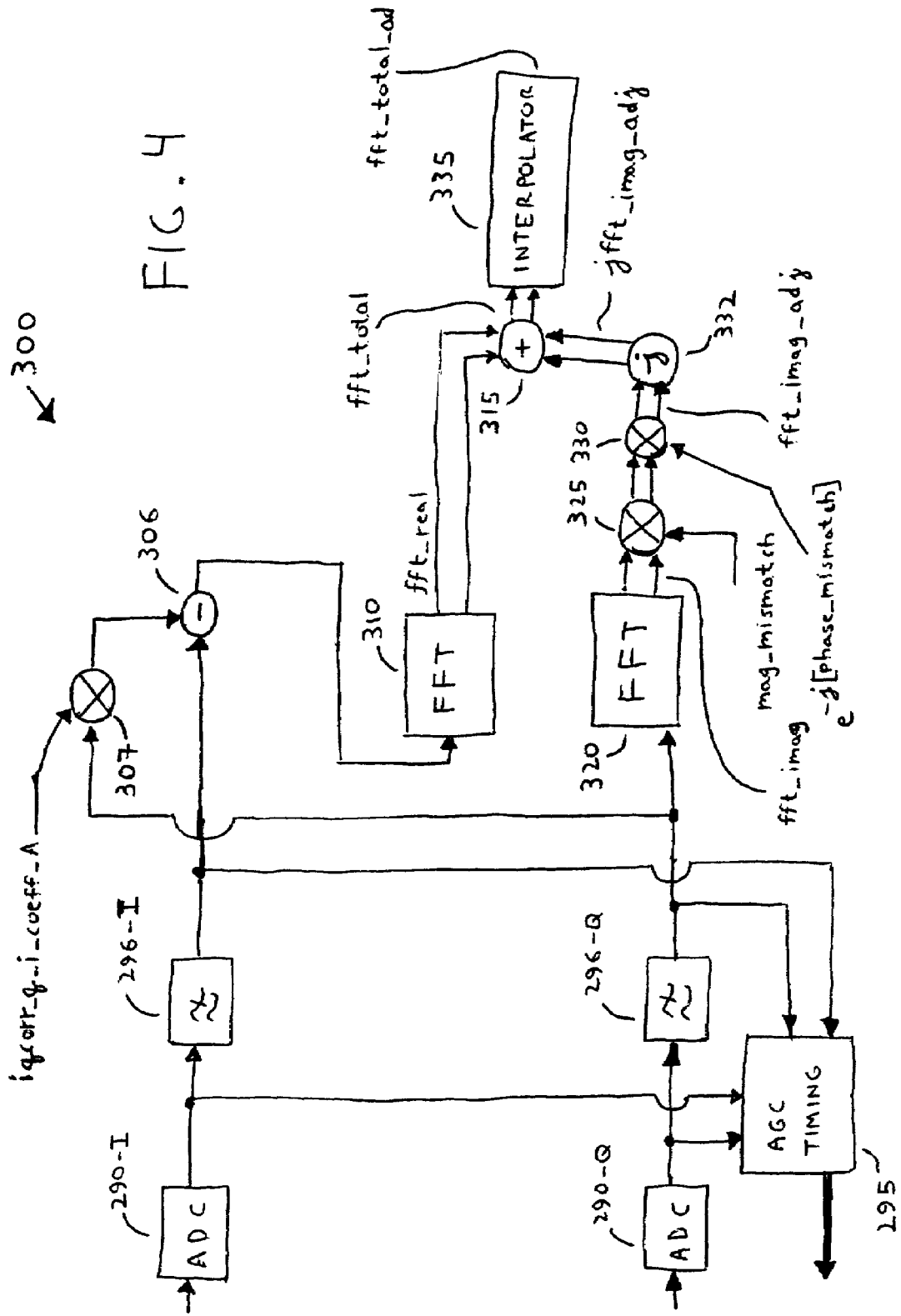
FIG. 4 is a block diagram illustrating an first exemplary embodiment of the calibration block of FIG. 3.

Referring now to FIG. 4, it is a block diagram illustrating an first exemplary embodiment 300 of the calibration unit 202 of FIG. 3. The embodiment 300 performs FIPM, FDPM, FDMM, and FIMM calibration and compensation. As shown in FIG. 4, the digitized baseband (BB) signals from the ADCs 290-I, 290-Q of FIG. 3 are passed through an in-phase finite impulse response (FIR) filter 296-I and a quadrature FIR filter 296-Q, respectively. The digitized BB signals are also each passed to the exemplary AGC and timing unit 295. For clarity, the FIR filters 296-I, 296-Q are each shown as one FIR filter, although more than one FIR filter can be cascaded together in each path. The FIR filters 296-I, 296-Q preferably act as both decimation filters and as standard low-pass filters. For example, according to a presently preferred embodiment, the FIR filters 296-I, 296-Q eliminate every other sample from their respective streams to reduce the data sampling rate from 80 MHz to 40 MHz for a normal 8.5 MHz single-sided bandwidth packet. The FIR filters 296-I, 296-Q are also configured to act as standard low-pass filters to remove any residual adjacent or aliased blockers before sending the data to the passive IQ calibration processing and onward. The resulting respective I/Q data signals from the FIR filters 296-I, 296-Q are fed back to the exemplary AGC and timing unit 295, which performs generally as described above to manage the amplifier gains and symbol timing.

The sampled Q component signal from the FIR 296-Q is presented to a multiplier 307 where the signal is multiplied by a scalar FIPM compensation value, iqcorr_q_i_coeff_A. The resulting signal is subtracted from the sampled I component signal from the FIR 296-I at a subtractor 306. The resulting adjusted and FIPM compensated I component signal is input to a first FFT 310. The sampled Q component signal is input to a corresponding second FFT 320. The FFTs 310, 320 are real input, complex output FFTs that output complex valued vectors at frequencies of interest in the frequency domain. A complex valued vector fft_real=Real{fft_real}+jImag{fft_real} is output from the FFT 310 and is presented to a summer 315. A complex valued vector fft_imag=Real{fft_imag}+jImag{fft_imag} is output from the FFT 320 and is multiplied at vector multipliers 325, 330 with the following respective vectors 1/mag_mismatch and $e^{-j[phase\_mismatch]}$ to form a FIMM/FDMM/FIMM compensated vector fft_imag_adj=Real{fft_imag_adj}+jImag{fft_imag_adj}. The vector 1/mag_mismatch compensates for FIMM and FDMM in the frequency domain. The vector $e^{-j[phase\_mismatch]}$ provides frequency domain compensation for FDPM. The resulting vector fft_imag_adj is multiplied by $j=\sqrt{-1}$ at a block 332 to form j fft_imag_adj=j Real{fft_imag_adj}+j²Imag{fft_imag_adj}= −Imag{fft_imag_adj}+j Real{fft_imag_adj}. The vector j fft_imag_adj is added to the vector fft_real at the summer 315 and the resulting vector fft_total is presented to an interpolator 335 for frequency correction and an adjusted vector fft_total_adj is generated and is available for continued processing within the receiver 200.

Although the embodiment 300 of FIG. 4 presents an example where FDPM and FDMM (and FIMM) compensation is performed in the frequency domain, at the vector multipliers 325, 330, generally it is advantageous as frequency dependent mismatch (FDPM and/or FDMM) becomes larger to cancel out these effects before a proper calibration of the FIPM is performed. If desired, this cancellation of the FDPM and FDMM could occur in the time domain before the FIPM by implementing filters for the I and Q channels based upon, for example, previously calculated calibration data, as shown, for example, in FIG. 7 or FIG. 8.

Typically, it is desirable to compensate for frequency dependent effects (FDPM, FDMM) before frequency independent effects (FIPM, FIMM). There are multiple ways according to the present invention to correct for these effects, once these effects are properly characterized by calibration, or at certain points during an ongoing calibration that updates one or more adaptive filters. An analog or digital filter may be selected for the I or the Q chain and configured with the appropriate differences in magnitude and phase between the I and Q chains as a function of frequency. Such a filter could be computed on the fly from the FDPM and FDMM calibration data according to standard filter design techniques well-known to those skilled in the art, or, for example, the filter could be chosen from the closest of a set of pre-computed filters. A designer could also decide to perform the correction in the frequency domain as shown in FIG. 4 with by taking the FFT of the I and Q components separately at FFTs 310, 320, then applying the phase and magnitude correction determined earlier to the FFT output that follows the Q channel (the Q channel is corrected in FIG. 4) and then combining the separate FFT 310 output and the adjusted FFT 320 output to form the corrected complex-input FFT output at the summer 315 prior to the interpolator 335.

Figure 5:
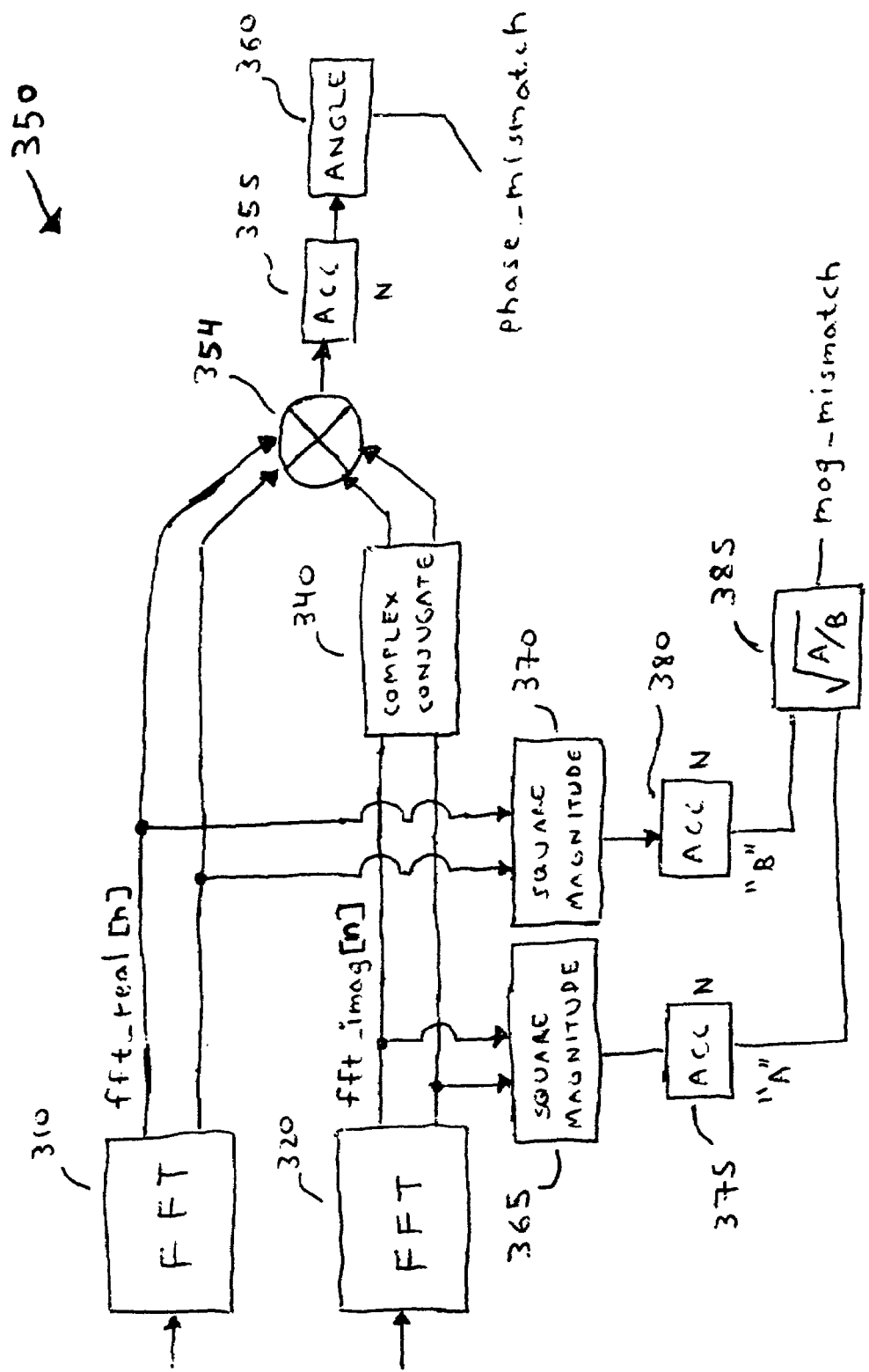
FIG. 5 is a block diagram illustrating exemplary processing to calculate correction factors according to the embodiment of FIG. 4.

FIG. 5 is a block diagram illustrating exemplary processing 350 that is used to determine correction factors that are used in the embodiment 300 of FIG. 4, i.e., the FIPM compensation vector phase_mismatch and the FIMM/FDMM compensation vector magnitude_mismatch. The vectors phase_mismatch, magnitude_mismatch, 1/mag_mismatch, $e^{-j[phase\_mismatch]}$, fft_real, fft_imag, fft_imag_adj, j fft_imag_adj, fft_total, and fft_total_adj are in general complex vectors having K values, where K represents the number of frequencies of interest. In a presently preferred embodiment, the digitized I and Q channel signals are OFDM signals that use 52 subcarriers spaced 312.5 kHz apart, and in this instance K=52. Of course, K is not limited to this value and can take on any number of frequencies of interest as suitable for the quadrature receiver that is used.

In FIG. 5 the complex valued vector fft_real is output from the FFT 310 and the complex valued vector fft_imag is output from the FFT 320. The notation [n] in fft_real[n] and fft_imag[n] in FIG. 5 signifies the nth sample value of the respective K length vectors, and the respective double parallel lines indicate the real and imaginary parts of the complex values in the respective K length vectors. The nth sample value of the complex valued vector fft_imag is presented to a complex conjugate block 340 which computes the complex conjugate fft_imag* and presents the sample to a vector multiplier 354. The nth sample value of the complex valued vector fft_imag* is multiplied by the nth sample value of the complex valued vector fft_real and the vector sample value is input to an accumulator 355 and is summed N times. An angle block 360 takes the angle of the result from the accumulator 355 so that the following equation is implemented:

$$\text{phase\_mismatch}_k = \text{angle}\left(\sum_{n=1}^{N} [\text{fft\_real}[n]_k \cdot (\text{fft\_imag}[n]_k)^*]\right) \quad (1)$$

where phase_mismatch$_k$ is the value of the K length vector phase_mismatch at the kth frequency (k: 1 . . . K) and N is the number of samples n (n: 1 . . . N) that are summed by the accumulator 355. The FDPM compensation vector phase_mismatch is the angle of the average of the correlation of I and Q channels.

It should be noted that the FDPM compensation vector phase_mismatch only calibrates the phase mismatch due to propagation delays in the I and Q paths—a difference in LO 280 phase at the I and Q inputs will not affect this result.

For calculation of the FDMM/FIMM compensation vector magnitude_mismatch, the nth sample values of the complex valued vectors fft_real and fft_imag are presented to respective square magnitude blocks 370, 365 with the resulting vector sample values being input to respective accumulators 380, 375 and summed N times. An division and square root block 385 operates on the results from the accumulators 380, 375 so that the following equation is implemented:

$$\text{magnitude\_mismatch}_k = \sqrt{\frac{\sum_{n=1}^{N} (|\text{fft\_real}[n]_k|^2)}{\sum_{n=1}^{N} (|\text{fft\_imag}[n]_k|^2)}} \quad (2)$$

where magnitude_mismatch$_k$ is the value of the K length vector magnitude_mismatch at the kth frequency (k: 1 . . . K) and N is the number of samples n (n: 1 . . . N) that are summed by the accumulators 380, 375.

Figure 6:
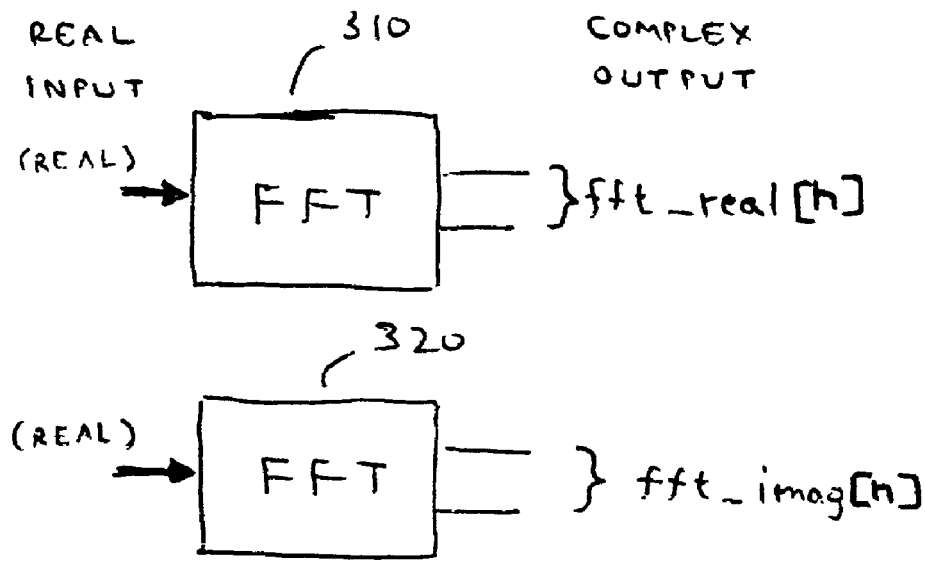
FIG. 6 is a block diagram illustrating an alternative exemplary implementation of a portion of the embodiment of FIG. 4.
Figure 6:
Figure 6:
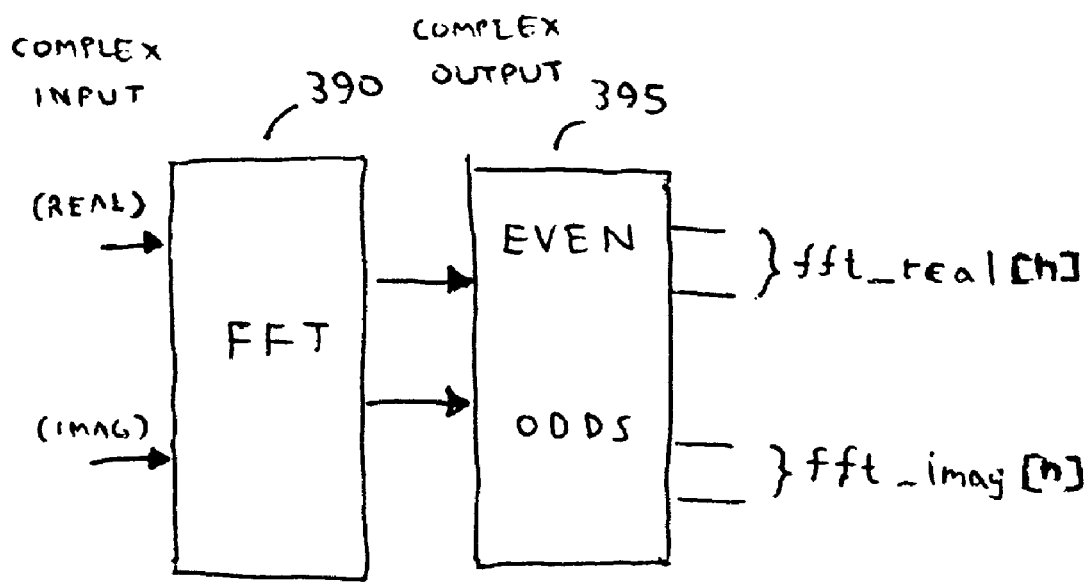

Rather than perform separate FFT calculations on the I and Q inputs at the respective FFTs 310, 320 of FIG. 4, the complex valued vectors fft_real and fft_imag can be constructed from a single complex-input, complex output FFT 390 and an even-odd block 395 as shown in FIG. 6 and according to the following well-known mathematical properties:

| Sequence x [n] | Fourier Transform $X(e^{-jw})$ | |
|---|---|---|
| Real$\{x[n]\} \Leftrightarrow$ | $X_e(e^{jw}) = 0.5[X(e^{jw}) + X^*(e^{-jw})]$ | (3) |
| Imag$\{x[n]\} \Leftrightarrow$ | $X_0(e^{jw}) = 0.5[X(e^{jw}) - X^*(e^{-jw})]$. | (4) |

In the embodiment 300 shown in FIG. 4, preferably FDPM and FDMM/FIMM calibration and compensation are performed first, followed by FIPM calibration and compensation, although the embodiment 300 is not limited to this order. For example, FDPM can be performed for $N_1$ samples, followed by FDMM/FIMM calibration for $N_2$ samples. For FDPM, a difference in delays between the I and Q paths prior to the ADCs 290-I, 290-Q is being calibrated, so independent noise sources cannot be used to perform FDPM calibration—as would be assumed if the signals presented to the mixers 275-I, 275-Q were a perfect 90 degrees out of phase with each other as in the ideal case. Preferably, during an initial calibration period the switched local IF oscillator 280 arrangement illustrated in FIG. 3 forces both the mixers 275-I, 275-Q to use the same phase of the LO 280 to mix the IF signal down to baseband. It will be understood by those skilled in the art that the present invention is not limited to this technique, and that any system that provides roughly the same wideband signal to both the I and Q chains is acceptable. It should be noted that the FDMM/FIMM calibration does not require the use of such a technique, and can be run independently of the FDPM calibration with the LO inputs to the mixers 275-I, 275-Q set to be ideally 90 degrees apart as in normal operation. It might be advantageous to run the FDPM calibration concurrently with the FDMM/FIMM calibration so that the same vectors fft_real and fft_imag from FFTs 310, 320 of FIG. 4 (or block 395 of FIG. 6) can be used over the same, or at least overlapping, numbers of samples.

According to exemplary operation of the embodiment 300, I/Q calibration begins while the I and Q components are purposely driven by the local IF oscillator signal at the same phase shifter, i.e. either phase shifter 208 or phase shifter 210. For example, during this initial calibration stage, the in-phase mixer 275-I may be connected at point B to the first phase shifter 208 while the quadrature mixer 275-Q is connected at point C to the same phase shifter 208, so that the mixers 275-I, 275-Q receive the local IF oscillator signal shifted by the same amount so that the "I" and "Q" components during this stage are ideally in phase with one another.

According to the example, during this initial testing period, the vectors phase_mismatch and magnitude_mismatch are preferably determined according to (1) and (2) as in FIG. 5 and, for example, at the conclusion of the initial testing period, the vectors provide respective FDPM and FDMM/FIMM compensation in the frequency domain as in FIG. 4 at vector multipliers 325, 330. Next, the scalar FIPM compensation value iqcorr_q_i_coeff_A is determined. In this embodiment, the value iqcorr_q_i_coeff_A depends on the vectors phase_mismatch and magnitude_mismatch as inputs and thus is calculated once these inputs are determined. The value iqcorr_q_i_coeff_A is given by the following equations:

$$iqcorr\_q\_i\_coeff\_A = (\text{mean}|_{for\ all\ k}[\text{phase\_mis\_vec}_k \circ \text{sign}(\text{freq}_k)]) \quad (5)$$

and $$phase\_mis\_vec_k = 2 \left( \frac{\sum_{g=1}^{G} [\text{fft\_real}[g]_k \cdot (\text{fft\_imag\_adj}[g]_k \cdot \text{magnitude\_mismatch}_k)^*]}{\sum_{g=1}^{G} [|\text{fft\_real}[g]_k|^2 + |\text{fft\_imag\_adj}[g]_k|^2]} \right) \quad (6)$$

where phase_mis_vec$_k$ is the value of the K length vector phase_mis_vec at the kth frequency (k: 1 . . . K), G is the number of samples g (g: 1 . . . G) that are summed to achieve the result in (6) and that occur after the, for example, N samples used to calculate the vectors phase_mismatch and magnitude_mismatch, freq$_k$ is the kth frequency of the K length vector freq, and sign(freq$_k$) ensures that the values corresponding to negative frequencies in the vector freq are multiplied by $-1$.

The scalar FIPM compensation value iqcorr_q_i_coeff_A multiplies the sampled Q component signal from the FIR 296-Q at the multiplier 307 and the resulting signal is subtracted from the sampled I component signal from the FIR 296-I at the subtractor 306 to accomplish the FIPM compensation.

One issue that arises here is that the FFT is normally run after a rotator, which multiplies the inputs to the FFT by a rotating complex exponential to cancel out the effects of frequency mismatch between the receiver and transmitter. This digital signal rotation will make performing I/Q calibration after the FFT more difficult. However, a workaround for this issue exists. As is well-known in the art, multiplying by a rotating complex exponential in time is equivalent to a shift in frequency, by the following equation:

$$e^{\frac{j2\pi Ln}{N}} x[n] \Leftrightarrow X[k-1] \quad (6a)$$

Therefore, if it is desirable to re-use the FFT outputs, the FFT output should be divided by the initial phase of the rotator at the start of the vector FFT input, followed by interpolation of the FFT output by L samples, where L may be a fractional number. In this way, applied to the passive calibration algorithms according to aspects of the present invention, a passive FDMM/FIMM and FIPM calibration circuit can be constructed that does not affect normal radio operations.

Figure 7:
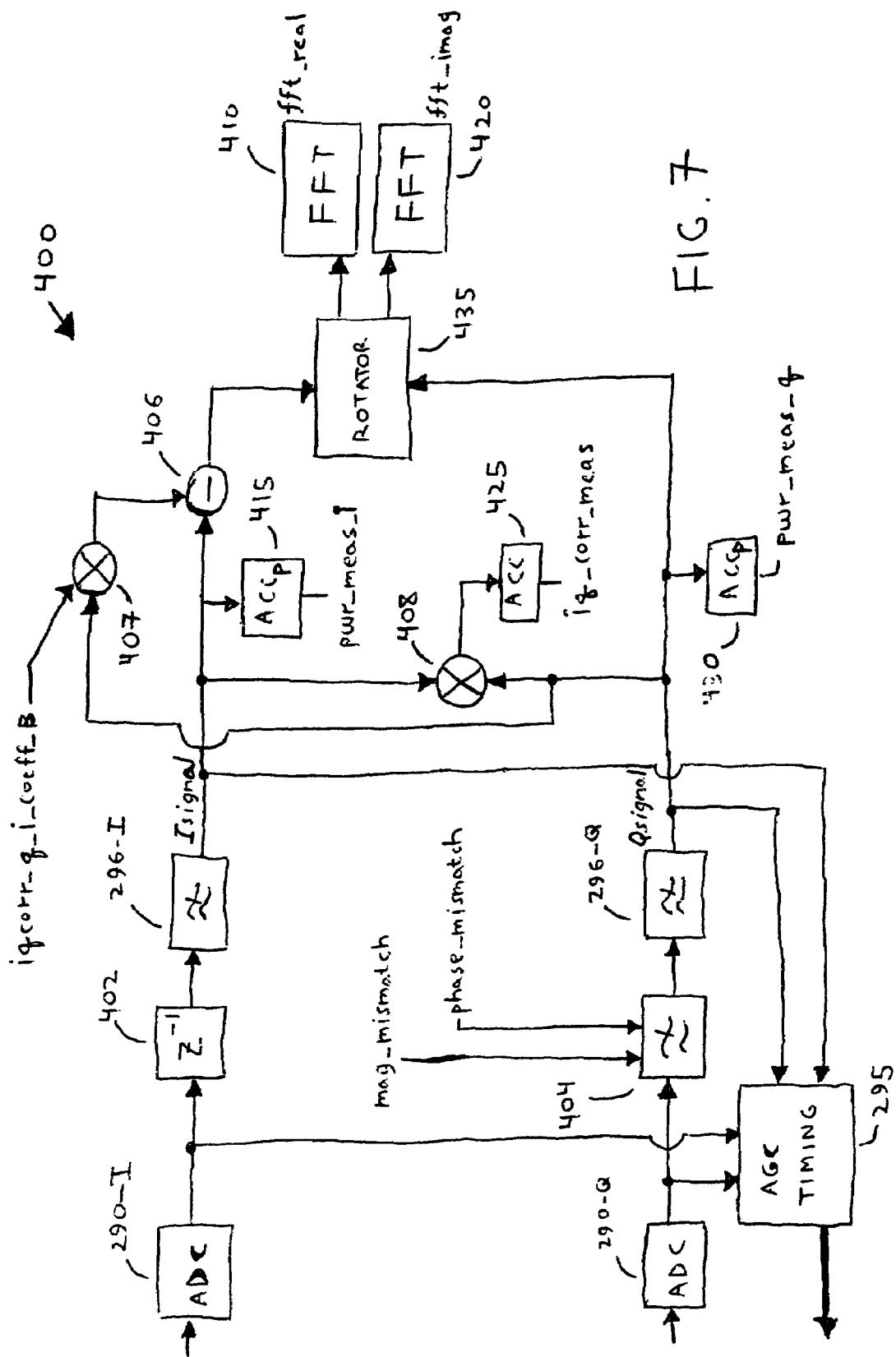
FIG. 7 is a block diagram illustrating a second exemplary embodiment of the calibration block of FIG. 3.

Referring now to FIG. 7, it is a block diagram illustrating a second exemplary embodiment 400 of the calibration unit 202 of FIG. 3. Like the first embodiment 300, the second embodiment 400 performs FIPM, FDPM, FDMM, and FIMM calibration and compensation. As shown in FIG. 7, the digitized BB signals from the ADCs 290-I, 290-Q of FIG. 3 are passed through a delay block 402 and an FIR filter 404, respectively. The digitized BB signals are also each passed to the exemplary AGC and timing unit 295. The FIR filter 404 provides time-domain FDPM, FDMM, and FIMM compensation, while the delay block 402 matches the delay of the FIR filter 404. The phase and magnitude responses of the FIR filter 404 are preferably adjusted at the K frequencies of interest according the received values of the FDPM compensation vector phase_mismatch and the FDMM/FIMM compensation vector magnitude_mismatch. It should be understood that the time-domain compensation filter such as the FIR filter 404 is interchangeable and can be placed on the Q channel or on the I channel, with the delay placed on the opposite channel. The time-domain compensation filter is thus configured to modify the magnitude and phase response appropriately. As is well known to those skilled in the art, the ideal frequency domain correction can be generated through standard filter generation techniques based on the frequency domain vector $1/\text{mag\_mismatch}°e^{-j[phase\_mismatch]}$. Of course, the filter used to compensate for FDPM/FDMM/FIMM can also be implemented as an analog filter and used on either the I or Q channel on the analog side of the ADCs 290-I, 290-Q.

The delayed digitized BB signal for the I channel is next passed to the in-phase finite impulse response (FIR) filter 296-I and the FDPM/FDMM/FIMM compensated digitized BB signal for the Q channel is next passed to the quadrature FIR filter 296-Q. The FIR filters 296-I, 296-Q preferably act as both decimation filters and as standard low-pass filters as described above. The resulting respective I/Q data signals from the FIR filters 296-I, 296-Q are fed back to the exemplary AGC and timing unit 295, which performs generally as described above to manage the amplifier gains and symbol timing.

The sampled and FDPM/FDMM/FIMM compensated Q component signal "Qsignal" from the FIR 296-Q is presented to multipliers 408, 407, a power accumulator (ACCp) 430, and a rotator 435. The sampled I component signal "Isignal" from the FIR 296-I is presented to the multiplier 408 where the signal is multiplied by the compensated Q component signal Qsignal, with the resulting signal "IQsignal" being passed to an accumulator 425. The sampled I component signal Isignal from the FIR 296-I also is passed to a power accumulator (ACCp) 415. At the multiplier 407, the compensated Q component signal Qsignal is multiplied by a scalar FIPM compensation value, iqcorr_q_i_coeff_B. The resulting signal from the multiplier 407 is then subtracted from the sampled I component signal Isignal from the FIR 296-I at a subtractor 406. The resulting adjusted and FIPM compensated I component signal is input to the rotator 435, which provides frequency correction by multiplying the I and Q signals (as I+jQ) with a rotating complex exponential with frequency equal to the estimated frequency mismatch between the transmitter and receiver and presents the complex result to a pair of FFTs 410, 420. The real part of the complex result is input to the first FFT 410 and the imaginary part of the complex result is input to the corresponding second FFT 420. The FFTs 410, 420 are real input, complex output FFTs that output complex valued vectors at frequencies of interest in the frequency domain. Of course, the complex valued vectors fft_real and fft_imag can be constructed from a single complex-input, complex output FFT such as FFT 390 and an even-odd block such as block 395 as described above and as shown in FIG. 6. A complex valued vector fft_real=Real{fft_real}+jImag{fft_real} is output from the FFT 410 and a complex valued vector fft_imag=Real{fft_imag}+jImag{fft_imag} is output from the FFT 420 during the initial FDPM and FDMM calibration with the rotator 635 disabled. During regular processing that follows the initial calibration, the rotator 635 is turned on and the output from the two FFTs 410, 420 is sent to a demodulator for further processing within the receiver 200. Of course, a single FFT can be used following the rotator 635 for normal operation and separate FFTs used to generate the FDPM/FDMM calibration inputs, instead of the two FFTs 410, 420 shown in FIG. 7. However, for purposes of hardware reuse it is advantageous to reuse the two FFTs 410, 420 as described above.

The complex valued vectors fft_real and fft_imag are used to determine the FDMM/FIMM compensation vector mag_mismatch and the FDPM compensation vector phase_mismatch using (1) and (2) as described above and as shown in FIG. 5. Preferably the FDPM/FDMM/FIMM calibration occurs during an initial calibration period in which the switched local IF oscillator 280 arrangement illustrated in FIG. 3 forces both the mixers 275-I, 275-Q to use the same phase of the LO 280 to mix the IF signal down to baseband, as described in more detail above.

According to exemplary operation of the embodiment 400, I/Q calibration begins while the I and Q components are purposely driven by the local IF oscillator signal at the same phase shifter, i.e. either phase shifter 208 or phase shifter 210. For example, during this initial calibration stage, the in-phase mixer 275-I may be connected at point B to the first phase shifter 208 while the quadrature mixer 275-Q is connected at point C to the same phase shifter 208, so that the mixers 275-I, 275-Q receive the local IF oscillator signal shifted by the same amount so that the "I" and "Q" components during this stage are ideally in phase with one another.

According to the example, during this initial testing period, the vectors phase_mismatch and magnitude_mismatch are preferably determined according to (1) and (2) as in FIG. 5 and, for example, at the conclusion of the initial testing period, the vectors provide respective FDPM and FDMM/FIMM compensation in the time domain as shown in FIG. 7 at the FIR filter 404. Next, the scalar FIPM compensation value iqcorr_q_i_coeff_B is determined. In this embodiment, the value iqcorr_q_i_coeff_B depends on the values pwr_meas_i, iq_corr_meas, and pwr_meas_q as inputs and thus is calculated once these inputs are determined by the power accumulator 415, the accumulator 425, and the power accumulator 430, respectively. The values pwr_meas_i, iq_corr_meas, and pwr_meas_q are given by the following equations:

$$\text{pwr\_meas\_i} = \sum_{m=1}^{M} [(I\text{signal}[m])^2] \quad (7)$$

$$\text{pwr\_meas\_q} = \sum_{m=1}^{M} [(Q\text{signal}[m])^2] \quad (8)$$

and $$\text{iq\_corr\_meas} = \sum_{m=1}^{M} [(IQ\text{signal}[m])] \quad (9)$$

where the notation [m] in Isignal[m], Qsignal[m], and IQsignal[m] signifies the mth sample value of the respective compensated digitized I, Q signals and signal product, and M is the number of samples m (m: 1 ... M) that are summed to achieve the results in (7), (8), and (9) and that occur after the, for example, N samples used to calculate the vectors phase_mismatch and magnitude_mismatch. In a presently preferred embodiment, the number of samples M is set at a value within the range $2^6 < M < 2^{20}$, although the present invention is not limited to values within this range and any suitable values may be used.

It should be understood that although the signals Isignal, Qsignal, and IQsignal are described as compensated for reference purposes, these signals are not actually compensated until after the FDPM and FDMM(and FIMM) calibration and compensation are performed. Of course, once the FIPM calibration is performed, the compensation of these signals has preferably been performed.

The values pwr_meas_i and pwr_meas_q measure the power on the I and Q channels, respectively, while the value iq_corr_meas measures the correlation between the I and Q channels. Statistically, there should be an equal amount of power on the I and Q channels and the I path should be uncorrelated with the Q path. Based on these assumptions, the FIPM compensation value iqcorr_q_i_coeff_B is given by the following equation:

$$\text{iqcorr\_q\_i\_coeff\_B} = 2 \frac{(\text{iq\_corr\_meas})}{(\text{pwr\_meas\_i} + \text{pwr\_meas\_q})}. \quad (10)$$

The scalar FIPM compensation value iqcorr_q_i_coeff_B multiplies the sampled Q component signal Qsignal from the FIR 296-Q at the multiplier 407 and the resulting signal is subtracted from the sampled I component signal Isignal from the FIR 296-I at the subtractor 406 to accomplish the FIPM compensation.

Figure 8:
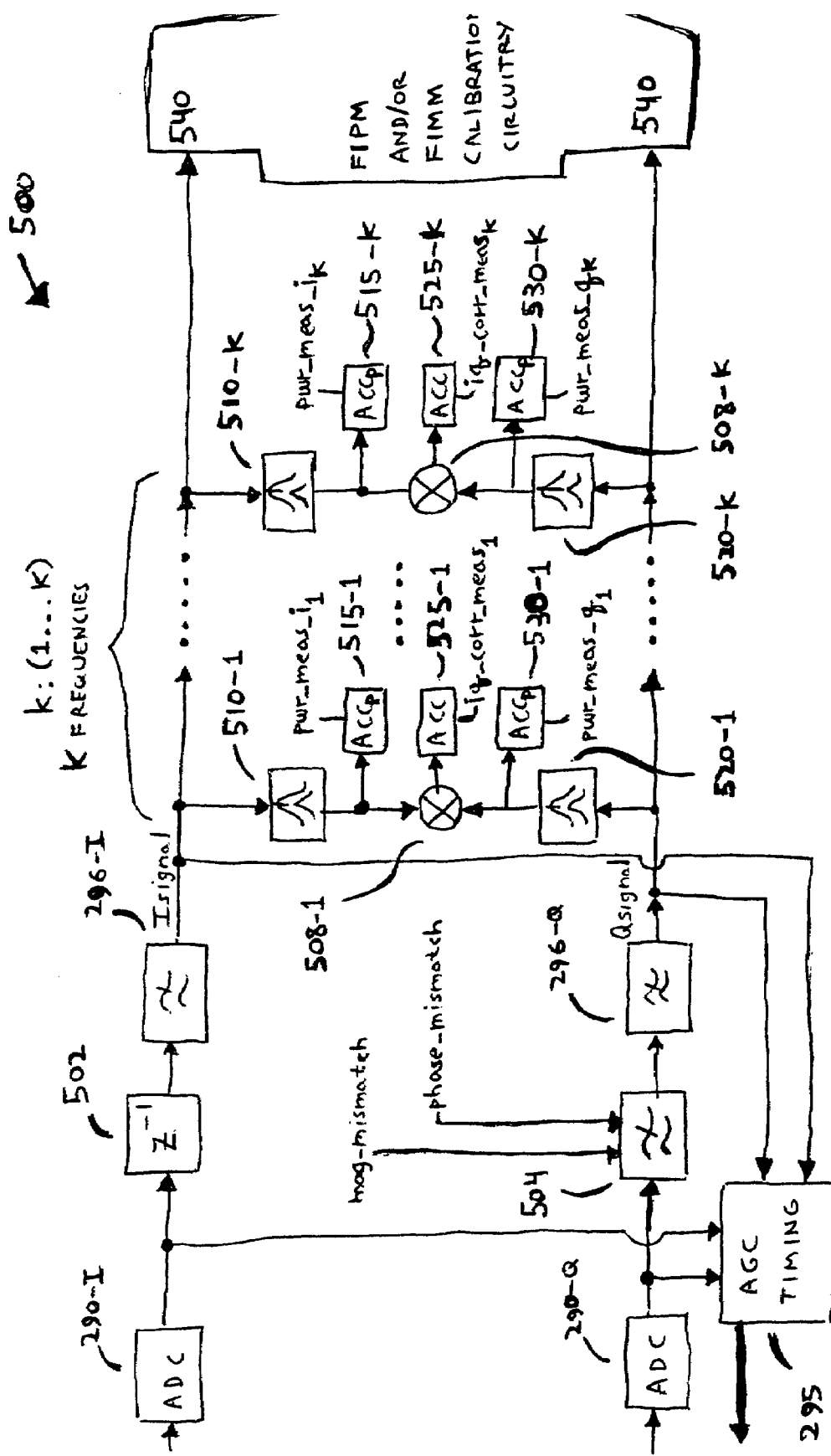
FIG. 8 is a block diagram illustrating a third exemplary embodiment of the calibration block of FIG. 3.

Referring now to FIG. 8, it is a block diagram illustrating a third exemplary embodiment 500 of the calibration unit 202 of FIG. 3. The third embodiment 500 as shown in FIG. 8 focuses on FDPM and FDPM calibration and compensation performed in conjunction with a series of time-domain bandpass filters for frequencies of interest, rather than FFTs. As 110 shown in FIG. 8, the digitized BB signals from the ADCs 290-I, 290-Q of FIG. 3 are passed through a delay block 502 and an FIR filter 504, respectively. The digitized BB signals are also each passed to the exemplary AGC and timing unit 295. The FIR filter 504 provides time-domain FDPM and FDMM compensation, while the delay block 502 matches the delay of the FIR filter 504. The phase and magnitude responses of the FIR filter 504 are preferably adjusted at the K frequencies of interest according to the received values of the FDPM compensation vector phase_mismatch and the FDMM/FIMM compensation vector magnitude_mismatch. These vectors are calculated somewhat differently in the embodiment 500 than in the embodiments 300,400, as described below. It should be understood that the time-domain compensation filter such as the FIR filter 504 is interchangeable and can be placed on the Q channel or on the I channel, with the delay placed on the opposite channel. The time-domain compensation filter is thus configured to modify the magnitude and phase response appropriately. As is well known to those skilled in the art, the ideal frequency domain correction can be generated through standard filter generation techniques based on the frequency domain vector $1/\text{mag\_mismatch}^\circ e^{-j[\text{phase\_mismatch}]}$. Of course, the filter used to compensate for FDPM and FDMM can also be implemented as an analog filter and used on either the I or Q channel on the analog side of the ADCs 290-I, 290-Q.

The delayed digitized BB signal for the I channel is next passed to the in-phase finite impulse response (FIR) filter 296-I and the FDPM/FDMM compensated digitized BB signal for the Q channel is next passed to the quadrature FIR filter 296-Q. The FIR filters 296-I, 296-Q preferably act as both decimation filters and as standard low-pass filters as described above. The resulting respective I/Q data signals from the FIR filters 296-I, 296-Q are fed back to the exemplary AGC and timing unit 295, which performs generally as described above to manage the amplifier gains and symbol timing.

If FIPM and/or FIMM calibration is implemented, the sampled and FDPM/FDMM compensated Q component signal "Qsignal" from the FIR 296-Q and the sampled I component signal "Isignal" from the FIR 296-I are presented to respective FIPM and/or FIMM calibration circuitry 540, such as the accumulator 425, the power accumulators 425, 430, and the multipliers 407, 408 described in this regard in embodiment 400 and in embodiment 600 (described below).

Turning attention to the FDPM and FDMM calibration features of the third embodiment 500, the sampled and FDPM/FDMM compensated Q component signal "Qsignal" from the FIR 296-Q is presented to a series of K variable bandwidth bandpass filters 520-1, ..., 520-K. The sampled I component signal "Isignal" from the FIR 296-I is similarly presented to a corresponding series of K variable bandwidth bandpass filters 510-1, ..., 510-K. The variable bandwidth filters may be implemented as, for example, programmable tap filters, or as fixed-coefficient filters, or the like, but the filters preferably are all implemented as the same type of filter. As above, K represents the number of frequencies of interest. In a presently preferred embodiment, the digitized I and Q channel signals are OFDM signals that use 52 subcarriers spaced 312.5 kHz apart, and in this instance K=52. Of course, K is not limited to this value and can take on any number of frequencies of interest as suitable for the quadrature receiver that is used. In particular, for OFDM need not utilize all 52 subcarriers frequencies to reduce hardware complexities The compensated Q component signal Qsignal is separated into respective signal components $\text{Qsignal}_1, \ldots, \text{Qsignal}_K$ at the variable bandwidth bandpass filters 520-1, ..., 520-K. The respective signal components $\text{Qsignal}_1, \ldots, \text{Qsignal}_K$ are presented to respective multipliers 508-1, ..., 508-K and respective power accumulators (ACCps) 530-1, ..., 530-K. Similarly, the I component signal Isignal is separated into respective signal components $\text{Isignal}_1, \ldots, \text{Isignal}_K$ at the variable bandwidth bandpass filters 510-1, ..., 510-K. The respective signal components $\text{Isignal}_1, \ldots, \text{Isignal}_K$ are presented to the respective multipliers 508-1, ..., 508-K and respective power accumulators (ACCps) 515-1, ..., 515-K. At the respective multipliers 508-1, ..., 508-K, the sampled signals $\text{Isignal}_1, \ldots, \text{Isignal}_K$ are multiplied with the corresponding sampled signals $\text{Qsignal}_1, \ldots, \text{Qsignal}_K$ to generate respective signal components $\text{IQsignal}_1, \ldots, \text{IQsignal}_K$, which are presented to respective accumulators 525-1, ..., 525-K.

Preferably the FDPM calibration occurs during an initial calibration period in which the switched local IF oscillator 280 arrangement illustrated in FIG. 3 forces both the mixers 275-I, 275-Q to use the same phase of the LO 280 to mix the IF signal down to baseband, as described in more detail above. The FDMM calibration, as described above, can occur simultaneously with the FDPM calibration during the initial calibration period (as assumed in this example), or can be run at any time subsequent to the start of the initial calibration period, including after the end of the period.

According to the example, during this initial testing period, the vectors phase_mismatch and magnitude_mismatch are preferably determined, and, for example, at the conclusion of the initial testing period, the vectors provide respective FDPM and FDMM compensation in the time domain as shown in FIG. 8 at the FIR filter 504. In this embodiment 500, the vectors phase_mismatch and magnitude_mismatch having length K depend on the corresponding series of values pwr_meas_$i_1$, ..., pwr_meas_$i_K$, pwr_meas_$q_1$, ..., pwr_meas_$q_K$, and iq_corr_meas$_1$, ..., iq_corr_meas$_K$ as inputs and thus are calculated once these inputs are determined by power accumulators 510-1, ..., 510-K, power accumulators 530-1, ..., 530-K, and accumulators 525-1, ..., 525-K, respectively. The values pwr_meas_$i_k$, iq_corr_meas$_k$, and pwr_meas_$q_k$ corresponding to a kth arbitrary frequency of interest (k: 1 ... K) are given by the following equations:

$$\text{pwr\_meas\_i}_k = \sum_{m=1}^{M} [(I\text{signal}[n]_k)^2] \quad (11)$$

$$\text{pwr\_meas\_q}_k = \sum_{n=1}^{N} [(Q\text{signal}[n]_k)^2] \quad (12)$$

and $$\text{iq\_corr\_meas}_k = \sum_{n=1}^{N} [(IQ\text{signal}[n]_k)] \quad (13)$$

where the notation [n] in Isignal[n]$_k$, Qsignal[n]$_k$, and IQsignal[n]$_k$ signifies the nth sample value of the respective bandpass filtered and digitized I, Q signals and signal product, and N is the number of samples n (n: 1 ... N) that are summed to achieve the results in (11), (12), and (13).

It should be understood that although the signals Isignal, Qsignal, and IQsignal are described as compensated for reference purposes, these signals are not actually compensated until after the FDPM and FDMM calibration and compensation are performed.

The two series of values pwr_meas_$i_1$, ..., pwr_meas_$i_K$, and pwr_meas_$q_1$, ..., pwr_meas_$q_K$ measure the power on, while the other series of values iq_corr_meas$_1$, ..., iq_corr_meas$_K$ measures the correlation between, the I and Q channels at respective frequencies of interest 1, ..., K. Statistically, there should be an equal amount of power on the I and Q channels, and the I path should be uncorrelated with the Q path, at respective frequencies of interest 1, ..., K. Based on these assumptions, the FDMM compensation vector mag_mismatch and the FDPM compensation vector phase_mismatch are given by the following equations:

$$\text{phase\_mismatch}_k = 2 \frac{(\text{iq\_corr\_meas}_k)}{(\text{pwr\_meas\_i}_k + \text{pwr\_meas\_q}_k)} \quad (14)$$

and $$\text{magnitude\_mismatch}_k = \sqrt{\frac{(\text{pwr\_meas\_i}_k)}{(\text{pwr\_meas\_q}_k)}} \quad (15)$$

where phase_mismatch$_k$ is the value of the K length vector phase_mismatch at the kth frequency (k: 1 ... K), and magnitude_mismatch$_k$ is the value of the K length vector magnitude_mismatch at the kth frequency. The FDPM compensation vector phase_mismatch is the angle of the average of the correlation of the I and Q channels, while the FDMM compensation vector magnitude_mismatch compares the root mean square power (rms) on the I channel with the rms power on the Q channel. These vectors preferably control to the filter 504 to achieve the FDPM and FDMM compensation.

Other versions of the third embodiment 500 may be used, such as, for example, one in which the variable bandwidth bandpass filters measure the K frequencies of interest in parallel, rather than sequentially. Similarly, the time-domain FDPM/FDMM compensation filter such as filter 504 with accompanying delay may be inserted after the bandpass filter stages rather than, for example, prior to the FIR filters 296-I, 296-Q or on the analog side prior to the ADCs 290-I, 290-Q. It is most important that the time domain FDPM/FDMM compensation filter be used prior to any FIPM and/or FIMM calibration circuitry 540.

In the first, second, and third exemplary embodiments 300, 400, 500, FIMM has been calibrated and compensated largely as a byproduct of the FDMM calibration and compensation, via the vector magnitude_mismatch. If the signals arriving at the mixers 275-I, 275-Q and originating from the LO 280 differ significantly in magnitude, different gains will be seen at the output of the mixers 275-I, 275-Q and separate FIMM calibration and compensation is desirable. This case is covered in the fourth embodiment 600, shown in FIG. 9, in which only FIPM and FIMM are calibrated and compensated for. Of course, it should be understood that separate FIMM calibration and compensation can be implemented and used advantageously in the first, second, and third exemplary embodiments 300, 400, 500 of FIGS. 4, 7, 8, respectively.

Figure 9:
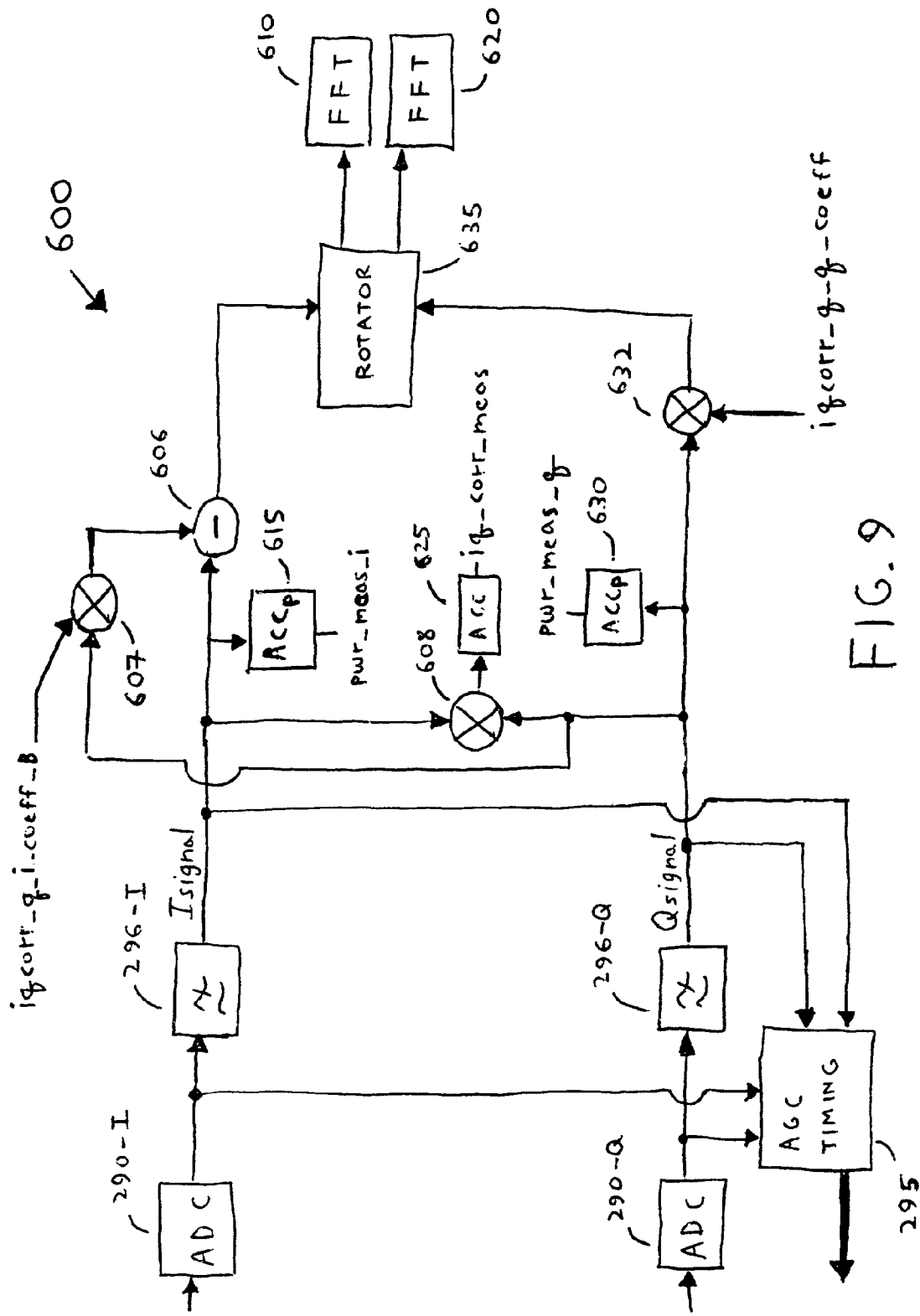
FIG. 9 is a block diagram illustrating a fourth exemplary embodiment of the calibration block of FIG. 3.

Referring now to FIG. 9, it is a block diagram illustrating a fourth exemplary embodiment 600 of the calibration unit 202 of FIG. 3. As shown in FIG. 9, the digitized BB signals from the ADCs 290-I, 290-Q of FIG. 3 are passed through the in-phase finite impulse response (FIR) filter 296-I and the quadrature FIR filter 296-Q, respectively. The digitized BB signals are also each passed to the exemplary AGC and timing unit 295.

The FIR filters 296-I, 296-Q preferably act as both decimation filters and as standard low-pass filters as described above. The resulting respective I/Q data signals from the FIR filters 296-I, 296-Q are fed back to the exemplary AGC and timing unit 295, which performs generally as described above to manage the amplifier gains and symbol timing.

The sampled Q component signal "Qsignal" from the FIR 296-Q is presented to multipliers 608, 607, 632 and a power accumulator (ACCp) 630. The sampled I component signal "Isignal" from the FIR 296-I is presented to the multiplier 608 where the signal is multiplied by the sampled Q component signal Qsignal, with the resulting signal "IQsignal" being passed to an accumulator 625. The sampled I component signal Isignal from the FIR 296-I also is passed to a power accumulator (ACCp) 615. At the multiplier 607, the sampled Q component signal Qsignal is multiplied by a scalar FIPM compensation value, iqcorr_q_i_coeff_B. The resulting signal from the multiplier 607 is then subtracted from the sampled I component signal Isignal from the FIR 296-I at a subtractor 606. The resulting adjusted and FIPM compensated I component signal is input to the rotator 635. At the multiplier 632, the sampled Q component signal Qsignal is multiplied by a scalar FIMM compensation value, iqcorr_q_q_coeff. The resulting adjusted and FIMM compensated Q component signal from the multiplier 632 is input to the rotator 635, which provides frequency correction by multiplying the compensated I component signal with the compensated Q component signal and presents the complex result to a pair of FFTs 610, 620, or a single FFT, for example, to generate FFT output that is available for continued processing within the receiver 200.

It should be understood that the fourth exemplary embodiment 600 is capable of performing fully passive I/Q calibration and compensation and does not require a special switched LO 280 arrangement for an initial calibration period or otherwise. Rather, the embodiment 600 implements passive FIPM and FIMM calibration without the use of a time domain (or frequency domain) FDPM/FDMM compensation filter.

According to exemplary operation of the embodiment 600, the scalar FIPM compensation value iqcorr_q_i_coeff_B and the FIMM compensation value iq_corr_q_q_coeff are determined. In this embodiment 600, as in embodiment 400, the value iqcorr_q_i_coeff_B depends on the values pwr_meas_i, iq_corr_meas, and pwr_meas_q as inputs and thus is calculated once these inputs are determined by the power accumulator 615, the accumulator 625, and the power accumulator 630, respectively. Similarly, the value iq_corr_q_q_coeff depends on the values pwr_meas_i and pwr_meas_q as inputs as well. The values pwr_meas_i, iq_corr_meas, and pwr_meas_q are given by the (7), (8), and (9), respectively.

The values pwr_meas_i and pwr_meas_q measure the power on the I and Q channels, respectively, while the value iq_corr_meas measures the correlation between the I and Q channels. Statistically, there should be an equal amount of power on the I and Q channels and the I path should be uncorrelated with the Q path. Based on these assumptions, the FIPM compensation value iqcorr_q_i_coeff_B is given by (10) and the FIMM compensation value iq_corr_q_q_coeff is given by the following equation:

$$iqcorr\_q\_q\_coeff = \sqrt{\frac{pwr\_meas\_i}{pwr\_meas\_q}}. \quad (16)$$

The scalar FIPM compensation value iqcorr_q_i_coeff_B multiplies the sampled Q component signal Qsignal at the multiplier 607 and the resulting signal is subtracted from the sampled I component signal Isignal at the subtractor 606 to accomplish the FIPM compensation. The scalar FIMM compensation value iqcorr_q_q_coeff multiplies the sampled I component signal Isignal at the multiplier 632 to accomplish the FIMM compensation.

One advantage of the I/Q calibration as implemented in the fourth exemplary embodiment 600 is that the calibration can be run completely passively, operating on the signals that are normally input without disturbing the radio operation. However, when FDPM calibration is being performed, the system can no longer operate completely passively, since the LO 280 of FIG. 3 is preferably switched to provide signals of equivalent phase to the mixers 275-I, 275-Q. However, for FDMM/FIMM and FIPM calibration the system can operate in this way, since the inputs to the mixers 275-I, 275-Q from the LO 280 are connected as in normal quadrature receiver operation, i.e. ideally 90 degrees out of phase.

The following Matlab computer program is an exemplary exploratory simulation environment demonstrating the FDPM/FDMM/FIPM/FIMM I/Q calibration according to an aspect of the present invention.

Program to Test IQ Calibration Algorithms

```
fftsize = 128; % size of FFT
mixer_phase_mismatch = -25 * pi/180; %freq_indep mismatch
num=40000 * fftsize; % # of points of noise to use
noise_rms = 100; %size of noise
% Filters used on I and Q for freq dependent effects
mag_filt_i = [0 1.1 .8];
mag_filt_q = [.8 1.2 .2];%.1];
%mag_filt_q = [.9 1 .05];%.1];
%mag_filt_q = mag_filt_i;
% Extra delay and gain on channel (both usually implemented with
% changes in mag_filt_i & q
q_delay = 0;
gain_i = 1;%.1;
for initial_phase_corr = [1 0]
    % Create random input noise
    noise_in = complex(randn(1,num),randn(1,num)) * noise_rms;
    % Switch to using same LO input if doing initial freq-dependent
    % phase cal, & include freq-indep phase mismatch
    if initial_phase_corr
        mix_out = complex(real(noise_in) * gain_i, cos(mixer_phase_mismatch) *
        real(noise_in) + sin(mixer_phase_mismatch) * imag(noise_in));
    else
        mix_out = complex(real(noise_in) * gain_i, cos(mixer_phase_mismatch) *
        imag(noise_in) + sin(mixer_phase_mismatch) * real(noise_in));
    end
```

```
% Add freq-dependent effects
noise_out = complex(filter(mag_filt_i,1,real(mix_out)), filter(mag_filt_q,1,imag(mix_out)));
noise_out = complex(real(noise_out), [imag(noise_out(q_delay+1:end))
imag(noise_out(1:q_delay))]);
noise_out_shape = reshape(noise_out,fftsize,num/fftsize);
% Plot actual freq dependent effects
figure(3)
[hreal,w] = freqz(mag_filt_i,1,64);
[himag,w] = freqz(mag_filt_q,1,64);
w=w/pi*20e6;
plot (w,abs(hreal) ,'r',w,abs(himag),'b--',w,abs(hreal)./abs(himag),'k-.')
grid
title('Actual Magnitude Response')
xlabel('Frequency (Hz)')
ylabel('Magnitude')
legend('I Filter Response','Q Filter Response',['Filter Magnitude' ' Mismatch'])
figure(4)
plot(w,unwrap (angle(hreal)),'r',w,unwrap(angle(himag)),'b--',w,unwrap(angle(hreal)) −
unwrap(angle(himag)),'k-.')
grid
title('Actual Phase Response')
xlabel('Frequency (Hz)')
ylabel('Phase (radians)')
legend('I Filter Response','Q Filter Response',['Filter Phase'     ' Mismatch'])
% calibrate freq dependent phase
if initial_phase_corr
    fft_real = fft(real(noise_out_shape)).';
    fft_imag = fft(imag(noise_out_shape)).';
    phase_mismatch = mean(fft_real. * conj(fft_imag));
    figure(7)
    plot((1:fftsize/2)/(fftsize/2)*20e6,unwrap(angle(phase_mismatch(1:fftsize/2))),'r',(1:fftsi
ze/2)/(fftsize/2)*20e6,unwrap(angle(hreal)) − unwrap(angle(himag,)),'b--')
    title('Measured Phase Mismatch')
    grid
    xlabel('Frequency (Hz)')
    ylabel('Radians')
    legend('Measured Phase Mismatch','Actual Phase Mismatch')
    % Calculate ideal correction funcitons in time & freq
    phase_corr_freq = exp(-1i. * angle(phase_mismatch));
    phase_corr_filter = real(ifft(exp(-1i * angle(phase_mismatch))));
else
% Perform magnitude cal
fft_real = fft(real(noise_out_shape)).';
fft_imag = fft(imag(noise_out_shape)).';
mag_mismatch = sqrt(mean(abs(fft_real).^2)./mean(abs(fft_imag.^2)));
figure(5)
plot((1:fftsize/2)/(fftsize/2)*20e6,mag_mismatch(1:fftsize/2),'r',
(1:fftsize/2)/(fftsize/2)*20e6,abs(hreal)./abs(himag),'b--')
title('Measured Magnitude Mismatch')
grid
xlabel('Frequency (Hz)')
ylabel('I/Q Magnitude Mismatch')
legend('Measured Magnitude Mismatch','Actual Magnitude Mismatch')
% Perform freq-independent phase cal
for index=1:num/fftsize
    fft_imag(index,:) = fft_imag(index,:).* mag_mismatch;
end
```

```
corr_target = sin(mixer_phase_mismatch)
% Perform freq_indep phase cal in time (easier)
time_domain_corr = ...
    sum(real(noise_out).*imag(noise_out))./sum(abs(noise_out).^2/2)
% Perform freq_indep phase cal infreq (more exact with large
        % freq-dependent magnitude mismatch
        freq_domain_corr_mat = (2 * (sum(fft_real.*...
            conj(fft_imag)))./(sum(abs(fft_real).^2 + abs(fft_imag).^2)));
        freq_domain_corr1 = -2*mean([imag(freq_domain_corr_mat(1.fftsize/2)) −
        imag(freq_domain_corr_mat(fftsize/2+1:end))])
    end
end
```

It should be noted that although the description refers to various figures that show various components to be separate from one another, it is possible that two or more components may be integrated into one. Similarly, two or more components may be used to replace or perform the functions of components that are illustrated as singular components. For example, a single processor can be appropriately programmed to perform the functions of one or more blocks or components shown in the various figures. Further, a programmed processor need not be used and one or more of these components can be implemented in dedicated hardware.

The present invention can be implemented in digital electronic circuitry, or in computer hardware, firmware, software, software-driven processing circuitry, discrete components, or in combinations of them. Apparatus of the invention can be implemented in a computer program product tangibly embodied in a machine-readable storage device for execution by a programmable processor; and method acts of the invention can be performed by a programmable processor executing a program of instructions to perform functions of the invention by operating on input data and generating output. The invention can be implemented advantageously in one or more computer programs that executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Although the present invention has been particularly described with reference to the preferred embodiments, the present invention should not be construed to be so limited, and it should be readily apparent to those of ordinary skill in the art that changes and modifications in the form and details may be made without departing from the spirit and scope of the invention. It is intended that the appended claims include such changes and modifications.

What is claimed is:

1. A method of calibrating and compensating for magnitude and phase imbalances in a quadrature receiver, the method comprising:
   simultaneously configuring a first analog signal on an in-phase signal path and a second analog signal on a quadrature signal path to be approximately in phase with one another, the first and second analog signals being derived from a received signal, the received signal being other than a signal received solely for the purposes of calibration;
   performing analog to digital conversion on the first and second analog signals to form in-phase and quadrature digital signals, respectively;
   generating first correction factors from the in-phase and quadrature digital signals; and
   compensating for at least frequency dependent phase imbalance using at least some of the first correction factors.

2. The method according to claim 1, wherein the step of simultaneously configuring comprises:
   switching local oscillator signals from a local oscillator at in-phase and quadrature mixers so that the local oscillator signals have approximately the same phase when presented to respective in-phase and quadrature mixers to simultaneously configure the first and second analog signals, respectively.

3. The method according to claim 1, further comprising, prior to the step of generating:
   for each of the in-phase and quadrature digital signals, decomposing the digital signals into one or more respective component digital signals corresponding to one or more respective frequencies at which the in-phase and quadrature signals are composed.

4. The method according to claim 3, further comprising, prior to the step of generating:
   determining second correction factors from the one or more respective component digital signals so that the second correction factors correspond to the one or more respective frequencies.

5. The method according to claim 4, wherein the steps of generating and determining rely on signal power measurements of the in-phase and quadrature digital signals for a plurality of frequencies.

6. The method according to claim 4, further comprising:
   correcting for frequency dependent magnitude and frequency dependent phase imbalances using at least some of the second correction factors.

7. The method according to claim 6, wherein the step of correcting is performed prior to the step of generating.

8. The method according to claim 6, wherein the step of correcting is performed at least partially simultaneously with the step of generating.

9. The method according to claim 6, wherein the step of correcting uses a time domain compensation filter that is programmed using at least some of the second correction factors.

10. The method according to claim 6, wherein the step of correcting uses frequency domain compensation based on the second correction factors.

11. A method of calibrating and compensating for magnitude and phase imbalances in a quadrature receiver, the method comprising:
   driving signals of an in-phase path and a quadrature path with a substantially same phase;
   generating in-phase and quadrature digital signals from the signals on the in-phase and quadrature paths, respectively;
   generating first correction factors from the in-phase and quadrature digital signals, the in-phase and quadrature signals being derived from a received signal, the received signal being other than a signal received solely for the purposes of calibration; and compensating for one or more of frequency dependent magnitude imbalance and frequency dependent phase imbalance using at least some of the first correction factors.

12. The method according to claim 11, wherein the received signal comprises a received modulated signal.

13. The method according to claim 11, wherein the calibrating and compensating for magnitude and phase imbalances is performed without the use of a specifically configured I/Q calibration signal but rather by examining regularly received signals that carry data.

14. The method according to claim 11, wherein generating in-phase and quadrature digital signals includes:
   performing analog to digital conversion on the signals on the in-phase and quadrature signal paths to form the in-phase and quadrature digital signals, the signals being derived from the received signal.

15. The method according to claim 14, wherein the received signal comprises an analog signal received at an antenna of the quadrature receiver in a wireless communications system.

16. The method according to claim 14, wherein the received signal comprises an analog signal received at the quadrature receiver in a wireline communications system.

17. A method of calibrating and compensating for magnitude and phase imbalances in a quadrature receiver, the method comprising:
   generating an in-phase digital signal from a first analog signal on an in-phase path;
   generating a quadrature digital signal from a second analog signal on a quadrature path;
   generating first and second correction factors from the in-phase and quadrature digital signals, the first and second analog signals being derived from a received signal, the received signal being other than a signal received solely for the purposes of calibration, the first correction factors being generated following an initial calibration period during which the first and second analog signals are configured to have approximately equal phase; and
   compensating for one or more of frequency independent magnitude imbalance, frequency independent phase imbalance, frequency dependent magnitude imbalance, and frequency dependent phase imbalance using the first and second correction factors.

18. The method according to claim 17, wherein the received signal comprises a received modulated signal.

19. A method according to claim 17, wherein the step of generating further comprises:
   basing the second correction factors at least in part on the first correction factors.

20. A method according to claim 17, wherein the first correction factors measure frequency dependent phase and magnitude imbalances arising from the in-phase and quadrature signal paths of the quadrature receiver.

21. A method according to claim 17, wherein the second correction factors measure frequency independent magnitude imbalances arising from the in-phase and quadrature signal paths of the quadrature receiver.

22. A method according to claim 17, wherein the second correction factors measure frequency independent phase imbalances arising from a correlation in the first and second analog signals.

23. A quadrature receiver capable of calibrating and compensating magnitude and phase imbalances, the quadrature receiver comprising:
   means for simultaneously configuring a first analog signal on an in-phase signal path and a second signal on a quadrature signal path to be approximately in phase with one another, the first and second analog signals being derived from a received signal, the received signal being other than a signal received solely for the purposes of calibration;
   means for performing analog to digital conversion on the first and second analog signals to form in-phase and quadrature digital signals, respectively;
   means for generating first correction factors from the in-phase and quadrature digital signals; and
   means for compensating for one or more of magnitude imbalance and phase imbalance using at least some of the first correction factors.

24. The quadrature receiver according to claim 23, wherein the means for simultaneously configuring comprises:
   means for switching local oscillator signals from a local oscillator at in-phase and quadrature mixers so that the local oscillator signals have approximately the same phase when presented to respective in-phase and quadrature mixers to simultaneously configure first and second signals, respectively.

25. The quadrature receiver according to claim 23, further comprising:
   for each of the digital in-phase and quadrature signals, means for decomposing the digital signals into one or more respective component digital signals corresponding to one or more respective frequencies at which the in-phase and quadrature digital signals are composed.

26. The quadrature receiver according to claim 25, further comprising:
   means for determining second correction factors from the one or more respective component digital signals so that the second correction factors correspond to the one or more respective frequencies.

27. The quadrature receiver according to claim 26, wherein the means for generating and the means for determining rely on signal power measurements of the in-phase and quadrature digital signals for a plurality of frequencies.

28. The quadrature receiver according to claim 26, further comprising:
   means for correcting for frequency dependent magnitude imbalance and frequency dependent phase imbalance using at least some of the second correction factors.

29. The quadrature receiver according to claim 28, wherein the means for correcting is active prior to the means for generating.

30. The quadrature receiver according to claim 28, wherein the means for correcting is active at least partially simultaneously with the means for generating.

31. The quadrature receiver according to claim 28, wherein the means for correcting uses a time domain compensation filter that is programmed using at least some of the second correction factors.

32. The quadrature receiver according to claim 28, wherein the means for correcting uses frequency domain compensation based on the second correction factors.

33. A quadrature receiver capable of calibrating and compensating magnitude and phase imbalances, the quadrature receiver comprising:
   means for generating an in-phase digital signal from a first analog signal on an in-phase path;

means for generating a quadrature digital signal from a second analog signal on a quadrature path;

means for generating first and second correction factors from the in-phase and quadrature digital signals, the first and second analog signals being derived from a received signal, the received signal being other than a signal received solely for the purposes of calibration, the first correction factors being generated following an initial calibration period during which the first and second analog signals are configured to have approximately equal phase; and means for compensating for one or more of frequency independent magnitude imbalance, frequency independent phase imbalance, frequency dependent magnitude imbalance, and frequency dependent phase imbalance using the first and second correction factors.

34. The quadrature receiver according to claim 33, wherein the received signal comprises a received modulated signal.

35. The quadrature receiver according to claim 33, wherein the means for generating further comprises means for basing the second correction factors at least in part on the first correction factors.

36. The quadrature receiver according to claim 33, wherein the first correction factors measure frequency dependent phase and magnitude imbalances arising from the in-phase and quadrature signal paths of the quadrature receiver.

37. The quadrature receiver according to claim 33, wherein the second correction factors measure frequency independent magnitude imbalances arising from in-phase and quadrature signal paths of the quadrature receiver.

38. The quadrature receiver according to claim 33, wherein the second correction factors measure frequency independent phase imbalances arising from a correlation in the first and second analog signals.

39. A computer-readable medium having computer executable instructions for calibrating and compensating magnitude and phase imbalances in a quadrature receiver stored thereon, which when executed by a processor performs steps of:

simultaneously configuring a first analog signal on an in-phase signal path and a second analog signal on a quadrature signal path to be approximately in phase with one another, the first and second analog signals being derived from a received signal, the received signal being other than a signal received solely for the purposes of calibration;

performing analog to digital conversion on the first and second analog signals to form in-phase and quadrature digital signals, respectively;

generating first correction factors from the in-phase and quadrature digital signals; and compensating for at least frequency dependent phase imbalance using at least some of the first correction factors.

40. The computer-readable medium according to claim 39, further comprising, prior to the step of generating:

for each of the in-phase and quadrature digital signals, decomposing the digital signals into one or more respective component digital signals corresponding to one or more respective frequencies at which the in-phase and quadrature digital signals are composed.

41. The computer-readable medium according to claim 40, further comprising, prior to the step of generating:

determining second correction factors from the one or more respective component digital signals so that the second correction factors correspond to the one or more respective frequencies.

42. The computer-readable medium according to claim 41, further comprising:

correcting for frequency dependent magnitude imbalance and frequency dependent phase imbalance using at least some of the second correction factors.

43. A computer-readable medium having computer executable instructions for calibrating and compensating magnitude and phase imbalances in a quadrature receiver stored thereon, which when executed by a processor performs steps of:

generating an in-phase digital signal from a first analog signal on an in-phase path;

generating a quadrature digital signal from a second analog signal on a quadrature path;

generating first and second correction factors from the in-phase and quadrature digital signals, the first and second analog signals being derived from a received signal, the received signal being other than a signal received solely for the purposes of calibration, the first correction factors being generated following an initial calibration period during which the first and second analog signals are configured to have approximately equal phase; and compensating for one or more of frequency independent magnitude imbalance, frequency independent phase imbalance, frequency dependent magnitude imbalance, and frequency dependent phase imbalance using the first and second correction factors.

44. The computer-readable medium according to claim 43, wherein the received signal comprises a received modulated signal.

45. The computer-readable medium according to claim 43, wherein the generating step further comprises basing the second correction factors at least in part on the first correction factors.

46. The computer-readable medium according to claim 43, wherein the first correction factors measure frequency dependent phase and magnitude imbalances arising from the in-phase and quadrature signal paths of the quadrature receiver.

47. The computer-readable medium according to claim 43, wherein the second correction factors measure frequency independent magnitude imbalances arising from the in-phase and quadrature signal paths of the quadrature receiver.

48. The computer-readable medium according to claim 43, wherein the second correction factors measure frequency independent phase imbalances arising from a correlation in the first and second analog signals.

* * * * *